(12) United States Patent
Lee et al.

(10) Patent No.: US 9,749,696 B2
(45) Date of Patent: Aug. 29, 2017

(54) METHOD AND APPARATUS FOR SEARCHING AND DOWNLOADING RELATED CONTENTS BY TERMINAL THROUGH BROADCAST SERVICE

(71) Applicant: LG ELECTRONICS INC., Seoul (KR)

(72) Inventors: Sangmin Lee, Anyang (KR); Seungjae Lee, Seoul (KR); Jihye Lee, Anyang (KR)

(73) Assignee: LG ELECTRONICS INC., Seoul (KR)

(*) Notice: Subject to any disclaimer, the term of this patent is extended or adjusted under 35 U.S.C. 154(b) by 6 days.

(21) Appl. No.: 14/297,411

(22) Filed: Jun. 5, 2014

(65) Prior Publication Data

US 2014/0289771 A1    Sep. 25, 2014

Related U.S. Application Data

(63) Continuation of application No. 12/814,076, filed on Jun. 11, 2010, now Pat. No. 9,288,541, which is a
(Continued)

(30) Foreign Application Priority Data

Nov. 27, 2009 (KR) .................. 10-2009-0116117
Mar. 8, 2010 (KR) .................. 10-2010-0020517

(51) Int. Cl.
*H04N 21/4722* (2011.01)
*H04N 21/472* (2011.01)
(Continued)

(52) U.S. Cl.
CPC ..... *H04N 21/4722* (2013.01); *G06Q 30/0603* (2013.01); *H04N 21/26283* (2013.01); *H04N 21/47202* (2013.01); *H04N 21/4882* (2013.01)

(58) Field of Classification Search
CPC ......... H04N 21/4722; H04N 21/47202; H04N 21/4882
See application file for complete search history.

(56) References Cited

U.S. PATENT DOCUMENTS

2004/0117831 A1    6/2004  Ellis et al.
2005/0090235 A1    4/2005  Vermola et al.
(Continued)

FOREIGN PATENT DOCUMENTS

CN          1452095 A        10/2003
CN   10-2004-0084932 A       10/2004
(Continued)

OTHER PUBLICATIONS

Service Guide for Mobile Broadcast Services, Candidate Version 1.0-26 Feb. 2008, Open Mobile Alliance, OMA-TS-BCAST-V1_020080226-C.*

*Primary Examiner* — Suraj Joshi
(74) *Attorney, Agent, or Firm* — Birch, Stewart, Kolasch & Birch, LLP

(57) ABSTRACT

A method for receiving a service guide and a terminal for receiving content related to particular content. The method includes storing, upon reception, at least one or more fragments of the service guide; transmitting a request message including an identifier of an interested content to a server; receiving a response message including first information regarding to at least one or more related contents with respect to the interested content; and if the stored at least one or more fragments of the service guide do not include a fragment identified by the first information, trying to receive the fragment identified by the first information.

16 Claims, 11 Drawing Sheets

Related U.S. Application Data continuation of application No. 12/786,234, filed on May 24, 2010, now abandoned.

(60) Provisional application No. 61/180,923, filed on May 25, 2009, provisional application No. 61/185,177, filed on Jun. 8, 2009, provisional application No. 61/240,288, filed on Sep. 7, 2009, provisional application No. 61/263,821, filed on Nov. 23, 2009.

(51) Int. Cl.
*H04N 21/262* (2011.01)
*G06Q 30/06* (2012.01)
*H04N 21/488* (2011.01)

(56) References Cited

U.S. PATENT DOCUMENTS

| | | |
|---|---|---|
| 2005/0240961 A1 | 10/2005 | Jerding et al. |
| 2006/0112434 A1 | 5/2006 | Banker et al. |
| 2006/0271973 A1 | 11/2006 | Jerding et al. |
| 2007/0055786 A1 | 3/2007 | Pohjolainen et al. |
| 2007/0072543 A1 | 3/2007 | Paila et al. |
| 2007/0204305 A1* | 8/2007 | Jung ............... H04H 60/72 725/51 |
| 2008/0126479 A1 | 5/2008 | Zhang et al. |
| 2008/0177998 A1 | 7/2008 | Apsangi et al. |
| 2008/0282309 A1 | 11/2008 | Kim et al. |
| 2009/0150808 A1 | 6/2009 | Aldrey et al. |
| 2009/0198658 A1* | 8/2009 | Delegue ............ G06F 17/30867 |

FOREIGN PATENT DOCUMENTS

| | | |
|---|---|---|
| CN | 101300837 A | 11/2008 |
| CN | 101305532 A | 11/2008 |
| CN | 131304354 A | 11/2008 |
| CN | 101378486 A | 3/2009 |
| KR | 10-2008-0078390 A | 8/2006 |
| KR | 10-2009-0000230 A | 1/2009 |
| WO | WO 2007/052989 A1 | 5/2007 |
| WO | WO 2007/052990 A1 | 5/2007 |
| WO | WO 2008/118292 A2 | 10/2008 |

\* cited by examiner

METHOD AND APPARATUS FOR SEARCHING AND DOWNLOADING RELATED CONTENTS BY TERMINAL THROUGH BROADCAST SERVICE

CROSS-REFERENCE TO RELATED APPLICATIONS

This application is a Continuation of co-pending application Ser. No. 12/814,076 filed on Jun. 11, 2010, which is a Continuation of application Ser. No. 12/786,234, filed on May 24, 2010, which claims priority to U.S. Provisional Application Nos. 61/180,923 filed May 25, 2009, 61/185,177 filed Jun. 8, 2009, 61/240,288 filed Sep. 7, 2009, and 61/263,821 filed Nov. 23, 2009, and Korean Patent Application Nos. 10-2009-0116117 filed Nov. 27, 2009 and 10-2010-0020517 filed Mar. 8, 2010. The entire contents of all are hereby incorporated by reference into the present application.

BACKGROUND OF THE INVENTION

Field of the Invention

The present invention relates to a method and apparatus for searching and downloading content in a terminal and, more particularly, to a method and apparatus for searching and downloading content related to particular content through a broadcast service received by the terminal.

Discussion of the Related Art

These days, in general, a terminal such as a mobile communication terminal or the like provides a supplementary service such as receiving and outputting video in addition to its general function such as radio communication. When the terminal receives content such as video, it can use a point-to-point method like a communication function. However, the point-to-point method may apply an excessive load to a mobile communication network in terms of mobile communication having a limited bandwidth. Thus, a method for providing content or the like to the terminal by using a broadcast service has been introduced.

When the terminal receives content through a broadcast service, it can subscribe to a service providing also a video on demand (VOD) with respect to the content. When the terminal subscribes to the service, a service provider of the broadcast service provides VOD information regarding the content currently viewed by the user of the terminal through a service guide with respect to the content. However, even when the user subscribes to the service, the service guide does not provide VOD information of different contents (e.g., a different episode of a TV show viewed by the user) related to the content currently viewed by the user. In addition, when the terminal has not subscribed to the service providing the VOD in addition, the service guide does not provide even the VOD information regarding the content currently viewed.

Thus, when the user of the terminal wants to purchase the content currently viewed or the content related to the content currently viewed as VOD, the terminal must request a general service guide including information regarding all the content and services from the service provider, search for his desired content from the service guide, and then again request the desired content from the service provider. Also, when the terminal stores the general service guide, the general service may be limited to be stored due to a limited memory capacity of the terminal.

Also, when the user of the terminal wants to purchase the entirety of different episodes of a miniseries to which the content currently viewed belongs, the service guide does not provide VOD information regarding the entire episodes. Thus, the user must request purchasing the episodes one by one, separately.

Also, service guide fragments required to obtain information regarding the service guide are transmitted to the user via a broadcast channel or an interactive channel, they are likely to be lost during the transmission. In addition, even a service guide fragment which has been already transmitted may be erased before its use is completed due to a limited memory capacity of the terminal.

Also, when the relationship between respective content is not clarified in the service guide, the user or the terminal cannot know the relationship of the content, and only broadcast servers know the relationship.

In addition, in order to check whether or not service guide fragments of the content related to content designated by the user are stored in the terminal, the user or the terminal must check every service guide fragment stored in the terminal one by one.

SUMMARY OF THE INVENTION

Therefore, in order to address the above matters, the various features described herein have been conceived. An object of the present invention is to simplify the process of searching and downloading content viewed by a user and different content related to the content viewed by the user. By achieving the object, the amount of network communication data between the terminal and a broadcast server can be minimized, and a waste of resource of the terminal and the network can be prevented. Also, the use of a service by the user can be induced through a simplified process.

Another object of the present invention is to prevent a waste of memory resources of a terminal by providing only a service guide with respect to related contents to the terminal.

Still another object of the present invention is to simplify a user's purchase procedure by providing a method for purchasing the entire related contents, and allow a service provider to set various price policies compared with purchasing individual content.

Yet another object of the present invention is to allow a server side such as a broadcast server or the like, rather than a terminal having a limited computing power and storage capacity, to perform more operations to enhance the speed of an overall operation.

Another object of the present invention is to provide a method for checking whether or not a related service in which a user may have an interest with respect to particular content designated by the user and service guide fragments, among service guide fragments which have been received by the terminal via a broadcast channel and an interactive channel from a broadcast server, are stored in the terminal, and receiving service guide fragments, which do not exist upon checking, via the interactive channel. The broadcast channel may refer to a channel received by using a service guide delivery descriptor defined in OMA BCAST 1.0 and a service guide delivery unit.

To achieve the above objects, there is provided a method for receiving content related to a particular content, including: transmitting a content request message including a content identifier of a particular content to a server; receiving a content response message including first information on at least one or more contents related to the content identifier from the server, wherein if there are at least one or more contents related to a global content identifier, the global state code has a value indicating success; checking whether there exists second information in guide information referred to by the first information on the related contents; receiving the second information if there is not the second information; and initiating a service request procedure by using the guide information. If the value of the global state code indicates success, the receiving of second information and the initiating of the service request procedure may be performed The content request message may be a related contents request message.

The content response message may be a related contents response message.

The guide information may be service guide information, and the first information on the related contents may be a provisioning service guide fragment with respect to the related contents.

The service guide fragment may provide an on-demand service of each of the related contents or an on-demand service of a bundled content of the related contents.

The provisioning service guide fragment may include one or more purchase item fragment, purchase channel fragment and purchase data fragment.

The second information may be a service fragment or a content fragment referred to by the purchase item fragment but not stored in the terminal.

The service fragment or the content fragment referred to by the purchase item fragment may be a service or content fragment matched to each of a service reference, a content reference and an identifier reference (idRef) in the purchase item fragment.

To achieve the above objects, there is also provided a terminal for receiving content related to particular content, including: a transceiver configured to communicate with a server; and a controller configured to control the transceiver. The transceiver transmits a content request message including a content identifier of particular content to the server, receives a content response message including first information on content related to the content identifier from the server. If there are at least one or more contents related to a global content identifier, the global state code has a value indicating success The controller may check whether there exists second information in guide information referred to by the first information on the related contents.

The transceiver further may receive the second information if there is not the second information, and initiate a service request procedure by using the guide information.

If there are at least one or more contents related to a global content identifier, the global state code may have a value indicating success. If the value of the global state code indicates success, the receiving of second information and the initiating of the service request procedure may be performed.

According to exemplary embodiments of the present invention, a service guide with respect to content related to a particular content is provided to a terminal. Thus, the process of searching for content viewed by the user through the terminal and different content related to the content is simplified, and the usage of memory resources of the terminal can be optimized.

Also, by providing a method for purchasing individual related content of the entire related contents, the user purchase procedure is simplified, and various price policies can be set compared to the case where a use has to purchase each individual content separately.

In addition, the present invention performs most of computational operations in a server side such as a broadcast server or the like rather than in the terminal with a limited computing power and storage capacity, thus enhancing the performance of overall operations.

The foregoing and other objects, features, aspects and advantages of the present invention will become more apparent from the following detailed description of the present invention when taken in conjunction with the accompanying drawings.

DETAILED DESCRIPTION OF THE INVENTION

Figure 1:
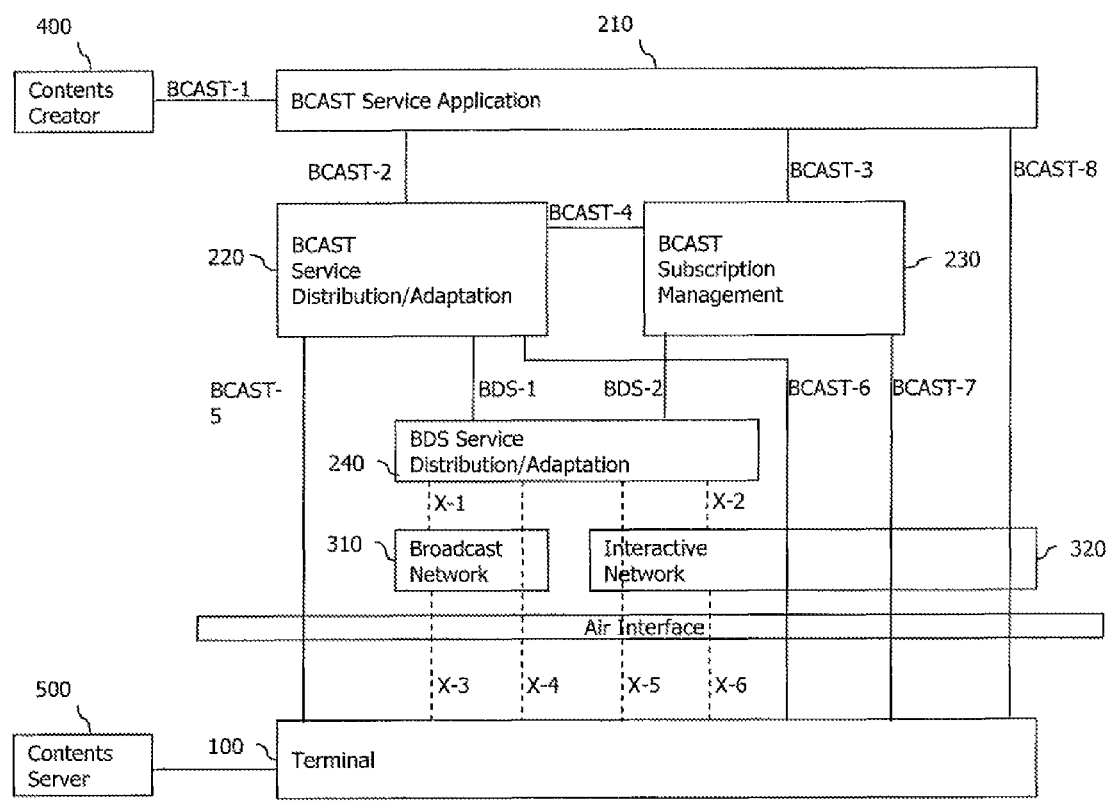
FIG. 1 illustrates the configuration of a system for searching and downloading content according to an exemplary embodiment of the present invention.

The present invention is applied to a method and apparatus for searching and downloading related contents through a broadcast service in a mobile terminal. However, the present invention is not limited thereto and may be applicable to any communication system and method to which the technical idea of the present invention is applicable.

The terminology used herein is for the purpose of describing particular embodiments only and is not intended to be limiting of the invention. Unless otherwise defined, all terms used herein have the same meaning as commonly understood by one of ordinary skill in the art to which this invention pertains, and should not be interpreted as having an excessively comprehensive meaning nor as having an excessively contracted meaning. If technical terms used herein is erroneous that fails to accurately express the technical idea of the present invention, it should be replaced with technical terms that allow the person in the art to properly understand. The general terms used herein should be interpreted according to the definitions in the dictionary or in the context and should not be interpreted as an excessively contracted meaning.

As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, steps, operations, elements, components, and/or groups thereof.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

It will be understood that when an element is referred to as being "connected with" another element, it can be directly connected with the other element or intervening elements may also be present. In contrast, when an element is referred to as being "directly connected with" another element, there are no intervening elements present.

The term 'purchase' used in the present invention includes a paid-in purchase and a free purchase. In particular, in case of the free purchase, it refers to simple downloading content or a service without requesting a particular user authentication, payment for something, an approval process, and the like.

The exemplary embodiments of the present invention will now be described with reference to the accompanying drawings, in which like numbers refer to like elements throughout. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings. The technical idea of the present invention should be interpreted to embrace all such alterations, modifications, and variations in addition to the accompanying drawings.

The terms used in the following description of the present invention will now be explained before describing the exemplary embodiments of the present invention.

Broadcast distribution system (BDS): A system having a function of transmitting the same IP flow to a plurality of terminals.

Broadcast service: A service for simultaneously distributing content to multiple reception terminals without having to know who is the reception terminals. The broadcast service includes, for example, a mobile TV, a mobile newspaper, mobile file downloading (game, software upgrade).

Broadcast channel: A logical channel providing broadcast transmission. A broadcast enabler uses the channel in order to distribute data to terminals in a broadcasting manner.

In general, the broadcast channel is a unidirectional channel, supports a high transfer rate, and is used for a downlink transmission. The broadcast channel is useful to transmit information to every terminal or a plurality of terminals as targets.

Service guide: Description information regarding a broadcast service that can be used by a subscriber or a terminal. A terminal first receives a service guide, receives an actual broadcast stream based on internal information of the service guide, and interprets it.

Interactive channel or interaction channel: A logical channel via which a mobile terminal interact with a broadcast service through point-to-point communication. The interactive channel may use HTTP(S) of upper TCP/IP.

Broadcast distribution system (BDS): It refers to a system having the capacity of simultaneously transmitting the same IP flow to several terminals. Generally, the BDS utilizes a technique for effectively using radio resources. The BDS includes a broadcast/multicast network function at a lower end of an IP layer and a service distribution/application function at an upper end of a supplementary IP layer.

Series: It's a set of various contents which are connected in their content like a soap opera or miniseries or has the same theme.

Episode: It indicates a single content in a series.

Relation: The expression of 'one content and other content are related' means that the two contents are similar in their substance or subject matter. Also, the relation between the different contents may be determined by the service provider.

Related contents inquiry: Related contents inquiry allows a service provider to offer a recommendation to a user according to a user preference (or user interest).

Hereinafter, a terminal is illustrated in the accompanying drawings, but the terminal may be also called by other names such as user equipment (UE), mobile equipment (ME), or mobile station (MS). Also, the terminal may be a portable device having a communication function such as a mobile phone, a PDA, a smart phone, a notebook computer, and the like, or may be a portability-unavailable device such as a personal computer (PC), a vehicle-mounted device.

FIG. 1 illustrates the configuration of a system for searching and downloading content according to an exemplary embodiment of the present invention.

As noted with reference to FIG. 1, a system for searching and downloading content according to an exemplary embodiment of the present invention may be based on a BCAST (broadcast) architecture.

A terminal 100 illustrated in FIG. 1, a user equipment (UE), receives information related to a broadcast service such as broadcast content, a service guide, and content protection information. The terminal 100 may support an interactive channel.

The contents searching and downloading system includes a BCAST service application (BSA) 210, a BCAST service distribution/adaptation (BSD/A) 220, a B CAST subscription management (BSM) 230, a BDS service distribution/adaptation unit 240, a content creator (or content provider) 400, and a content server 500.

The BSA 210 is an entity corresponding to an application unit of a broadcast service such as audio/video streaming or movie file downloading. The BSA 210 receives broadcast data from the contents creator 400 encodes the received broadcast data into a form suitable for broadcasting, and supplies a BCAST service attribute to the BSD/A 220 and the BSM 230. Also, the BSA 210 may manage charging information (or billing information).

The BSD/A 220 is an entity handling a coupling of a BCAST service and a coupling of a BDS. The BSD/A 220 performs the function of distribution of a file/stream, service combining, protection of a service/content, generating and transferring a service guide, and a notification (or announcement) message transfer function.

The BSM 230 is an entity of performing service provisioning such as subscription and payment, transferring information required for receiving the BCAST service, and managing the terminal 100. The BSM 230 supports a notification message, a service protection management, a contents protection management, a service guide generation and a terminal provisioning function, and interacts with the BDS service distribution/adaptation unit 240 to manage communication with the terminal 100 and subscription information. Also, The BSM 230 may transfer user payment information to the BSA 210.

The BDS service distribution/adaptation unit 240 is an entity of delivering a broadcast service including a file/stream distribution and a service guide distribution to the BDS. Also, the BDS service distribution/adaptation unit 240 may further perform a function of an encryption/decryption key distribution, a broadcast subscription management, an account management. The BDS service distribution/adaptation unit 240 is connected with an interactive network 320 to process a service discovery, a protection of a service limited to BDS, and other interactive function. Also, the BDS service distribution/adaptation unit 240 is connected with a broadcast network 310 in order to deliver content to the terminal 100.

Meanwhile, the illustrated broadcast network 310 provides a function of delivering content by using a broadcast channel. The broadcast network 310 may accompany a radio network which is the same as or different from a network used in the interactive channel.

The illustrated interactive network 320 provides an interactive channel. The interactive network 320 may accompany a radio network which is the same or different from the network used in the broadcast channel.

The content creation 400 is an entity providing content to the BS. For example, the content may be data such as movie, record (or album), news text, and the like. The content creation 400 may provide a delivery paradigm (e.g., a streaming server) or provide basic data for explaining content.

The content server 500 is an entity of providing content to the terminal 100. The content server 500 may be the same entity as the content creation 400.

The interface between the foregoing elements will now be described.

A BCAST-1 interface is used to deliver content, a content attribute, and a notification message. A BCAST-2 is used to deliver a BCAST service attribute and a content attribute belonging to a program such as a content-nonprotected BCAST service, explanation, and genre. A BCAST-3 interface is used to deliver a BCAST service attribute and a content attribute belonging to service provision such as a user profile and location information. A BCAST-4 interface is used to deliver a notification message, a service guide, a fragment (related to provision, purchase and subscription), long term key messages, short term key messages, a terminal providing object, a terminal providing message, and a terminal management message. A BCAST-5 provides a nonprotected and/or protected BCAST service, a content-nonprotection and/or content-protection BCAST service, a BCAST service attribute and content attribution notification, a distribution of a service guide and a security material, in the broadcast distribution system. The distribution may include traversing of the BSD service distribution/adaptation unit. A BCAST-6 interface provides a nonprotected and/or protected BCAST service in the broadcast distribution system, a content-nonprotection and/or content-protection BCAST service, a BCAST service attribute and content attribution notification, a service guide, and a terminal report related to a security material, stream, and file delivery, in the interactive network. A BCAST-7 interface provides service provisioning, subscription information, terminal provisioning, a security material, and device registration in the interactive network. A BCAST-8 interface is used for a user interactive, report, and user preference.

A BDS-1 interface is used to transfer a nonprotected or protected BCAST service, a content nonprotected BCAST service, a BCAST service attribute and content attribute, a BCAST service/content, a notification message, a notification priority, a service guide, and the like. A BDS-2 interface is used to delivery service provision, subscription information, device management, and information regarding a security material.

An X-1 interface is an interface between the BDS service distribution/adaptation unit 240 and the BDS. An X-2 interface is an interface between the BDS service distribution/adaptation unit 240 and the interactive network 320. An X-3 interface is an interface between the BDS and the terminal 100. An X-4 interface is an interface between the BDS service distribution/adaptation unit 240 and the terminal 100. An X-5 interface is an interface between the BDS service distribution/adaptation unit 240 and the terminal 100 through an interactive channel. An X-6 interface is an interface between the interactive network 320 and the terminal 100.

Figure 2:
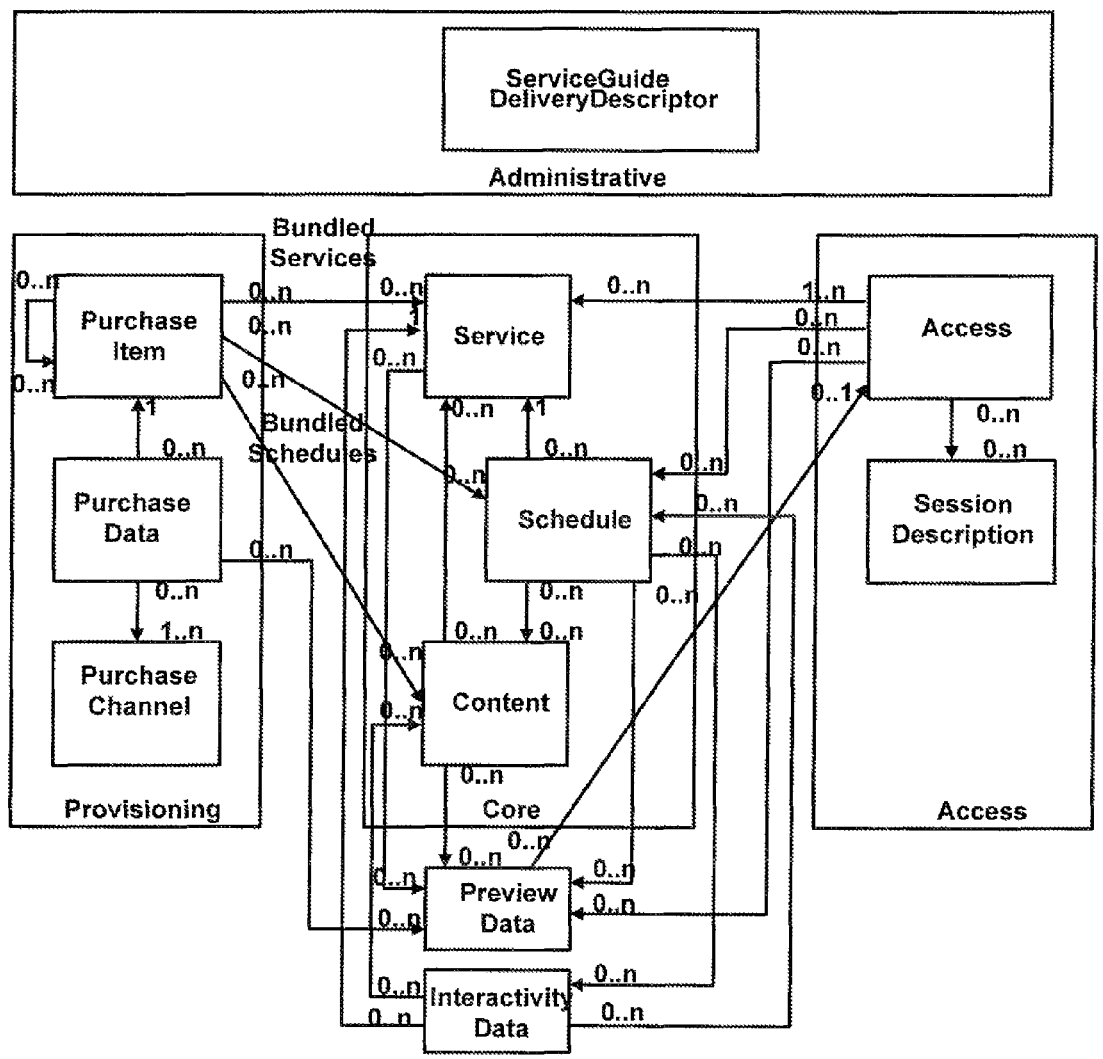
FIG. 2 illustrates the configuration of a service guide according to an exemplary embodiment of the present invention.

FIG. 2 illustrates the configuration of a service guide according to an exemplary embodiment of the present invention.

As shown in FIG. 2, the service guide according to an exemplary embodiment of the present invention may be based on a BCAST 1.0 definition.

The service guide includes an administrative part, a provisioning part, a core part, an access part, and others.

The administrative part includes a ServiceGuideDeliveryDescriptor element. The ServiceGuideDeliveryDescriptor is transmitted via a service guide announcement channel, and allows the terminal 100 to know about whether or not fragments of a service guide exist, metadata, and grouping through a service guide discovery process. The other remaining service guide fragments, except for the administrative part may be delivered via a file delivery session of a broadcast channel or an interactive channel.

The core part includes a service fragment, a schedule fragment, and a content fragment.

The access part includes an access fragment and a session description fragment.

The provisioning part includes a purchase item fragment, a purchase data fragment, and a purchase channel fragment.

The service guide includes a preview data fragment, an interactivity data fragment, besides the above-mentioned parts.

Hereinbelow, the semantic of each fragment will now be described.

The service fragment describes a coupling relationship of content items constituting a broadcast service. Also, the service fragment may include a component related to a service function such as purchase or subscription information. The service fragment is a part of the service guide, serving as a central hub of other fragments.

The schedule fragment defines a time frame for a related content item to be streamed, downloaded or rendered. The schedule fragment always refers to the service fragment or the content fragment. An OnDemand attribute of the schedule fragment indicates whether or not content referred to by the schedule fragment is accessible via unicast channel and content transmission is not necessarily bounded by specific time interval.

The content fragment provides a detailed description of a particular content item. The content fragment deals with a target user group of the content, a geographical location, a genre, or content of the youth protection. The content fragment may be referred to from the preview data fragment or the service fragment.

The access fragment describes how a service can be accessed during its life period. The access fragment refers to the service by using session description information or a URI, and indicates a delivery method of the service. The service fragment may be referred to from one or more of the access fragments in order to access a service related to the service fragment or provide various methods for interacting with the service related to the service fragment. The access fragment provides information regarding the capability required by the terminal in order to receive and render a particular service. A network address of content referred to by the schedule fragment can be provided in AccessServerURL attribute of the access fragment if the content are transmitted via unicast channel and can be provided in a contentLocation attribute of the schedule fragment referred to by the access fragment if the content is transmitted via multicast or broadcast channel.

The session description fragment provides session information required to access a particular service. Also, the session description fragment may further include supplementary description information to be used in a related delivery procedure. Information regarding the session description is provided via an SDP (Session Description Protocol: See RFC 4566) syntax or 3GPP MBMS USDB (User Service Bundle Description) [3GPP TS 26.346].

The purchase item fragment indicates a group of one or more services or one or more content items provided to an end user free of charge or through subscription or purchase. A service provider may include the purchase item fragment in a service guide and deliver purchase information regarding a bundle (combination) of service/content/schedule to the user. The purchase item fragment may be referred to from the purchase data fragments providing information regarding other service bundles. The purchase item fragment may refer to associated service or content fragment.

The purchase data fragment provides price information of a service, a service bundle, and a content item. The service provider may include the purchase data fragment in the service guide and deliver the price of each purchase item to the user.

The purchase channel fragment provides information regarding an entity for obtaining an access authority and/or usage authority about a particular service, service bundle, and content item.

The preview data fragment includes information suitable for expressing the outline of a service or content to the user. The user recognizes what kind of service or content it is through the information. The preview data fragment may include simple text, a static image, a short video clip, and even a reference to a different service of a low bit rate related to a main service. The service fragment, the content fragment, the purchase data fragment, the access fragment, and the schedule fragment, among the above-mentioned fragments, can refer to the preview data fragment.

The interactivity data fragment includes information for providing an interactive service related to a broadcast content to the user through the terminal. The interactive service allows, for example, the user to vote while viewing a TV show or obtain content related to broadcast content currently being viewed. The interactivity data refers to one or more interactivity media documents. The interactivity media document includes an xhtml page, a static image, an e-mail template, an SMS (Short Message Service) template, and an MMS (Multimedia Message Service) template document. The interactivity data fragment may refer to a service fragment, a content fragment, a schedule fragment. The schedule fragment may refer to the interactivity data fragment.

Figure 3:
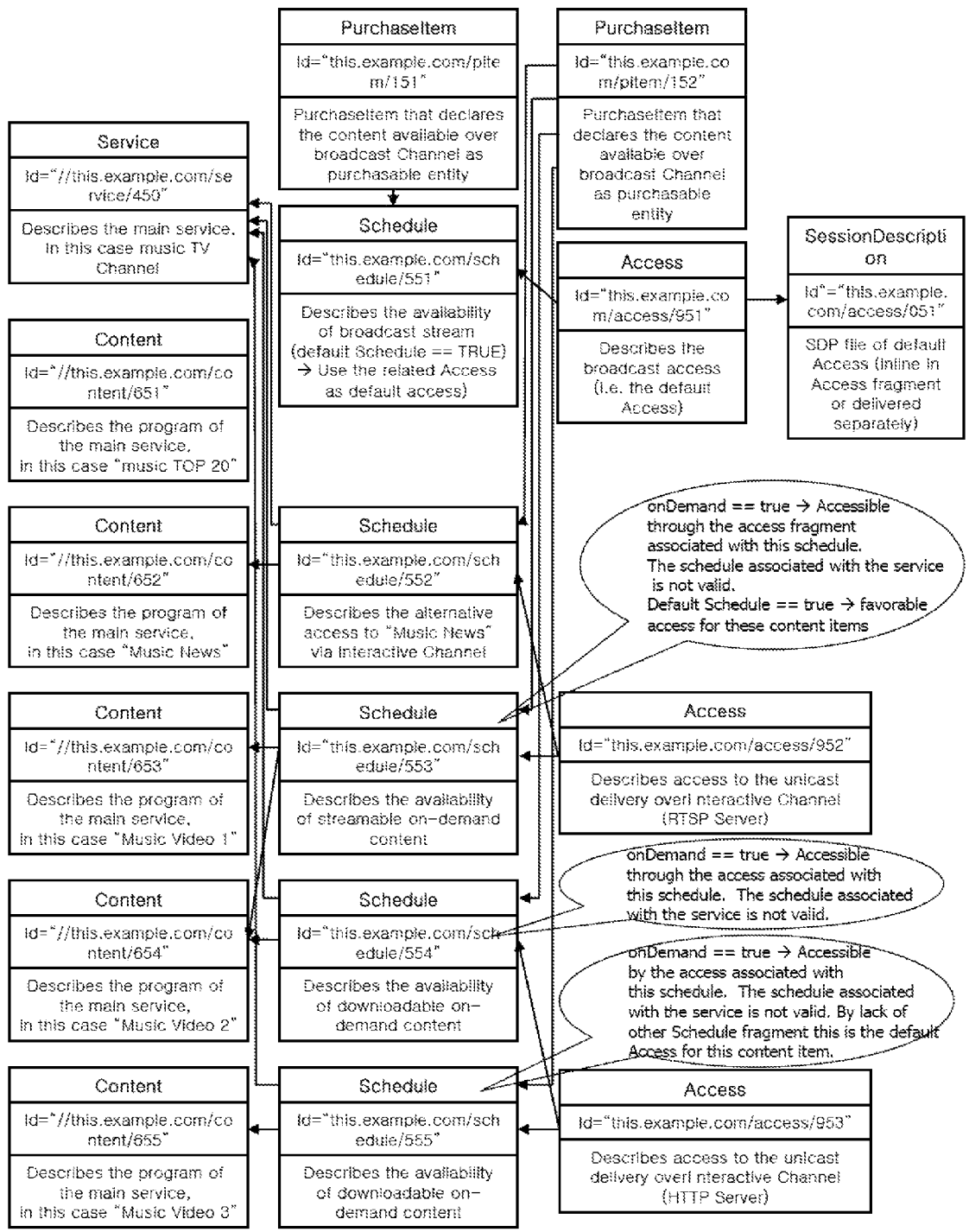
FIG. 3 illustrates an example of the service guide according to an exemplary embodiment of the present invention.

FIG. 3 illustrates an example of the service guide according to an exemplary embodiment of the present invention.

In FIG. 3, a service fragment providing a music TV channel is referred to by five content fragments. The content fragments include a detailed description of Music Top 20, Music News, Music Video 1, Music Video 2, and Music Video 3.

Also, the service fragment is referred to by five schedule fragments. A first schedule fragment is id="//this.example-.com/schedule/551" and connected with an access fragment providing a Music TV channel service in the form of a broadcast stream. A second schedule fragment is id="//this.example.com/schedule/552" and connected with an access fragment providing Music TV channel service and Music News content by using an interactive channel. A third schedule fragment is id="//this.example.com/schedule/553" and connected with an access fragment providing Music Video 1 content and Music Video 2 content as on-demand in the form of a stream. A fourth schedule fragment is id="//this.example.com/schedule/554" and connected with an access fragment providing Music Video 2 content as on-demand in a download form. A fifth schedule fragment is id="//this.example.com/schedule/555" and connected with an access fragment providing Music Video 3 content as on-demand in a download form.

The service guide additionally includes a purchase item fragment (id="//this.example.com/pitem/151") for supporting purchase of content connected with the schedule fragment of id="/this.example.com/schedule/551", and a purchase item fragment (id="//this.example.com/pitem/152") for supporting simultaneous purchasing of contents connected with the schedule fragments of id="//this.example-.com/schedule/552" and id="//this.example.com/schedule/553".

Hereinafter, a processing procedure of the system according to an exemplary embodiment of the present invention will now be described.

Figure 4:
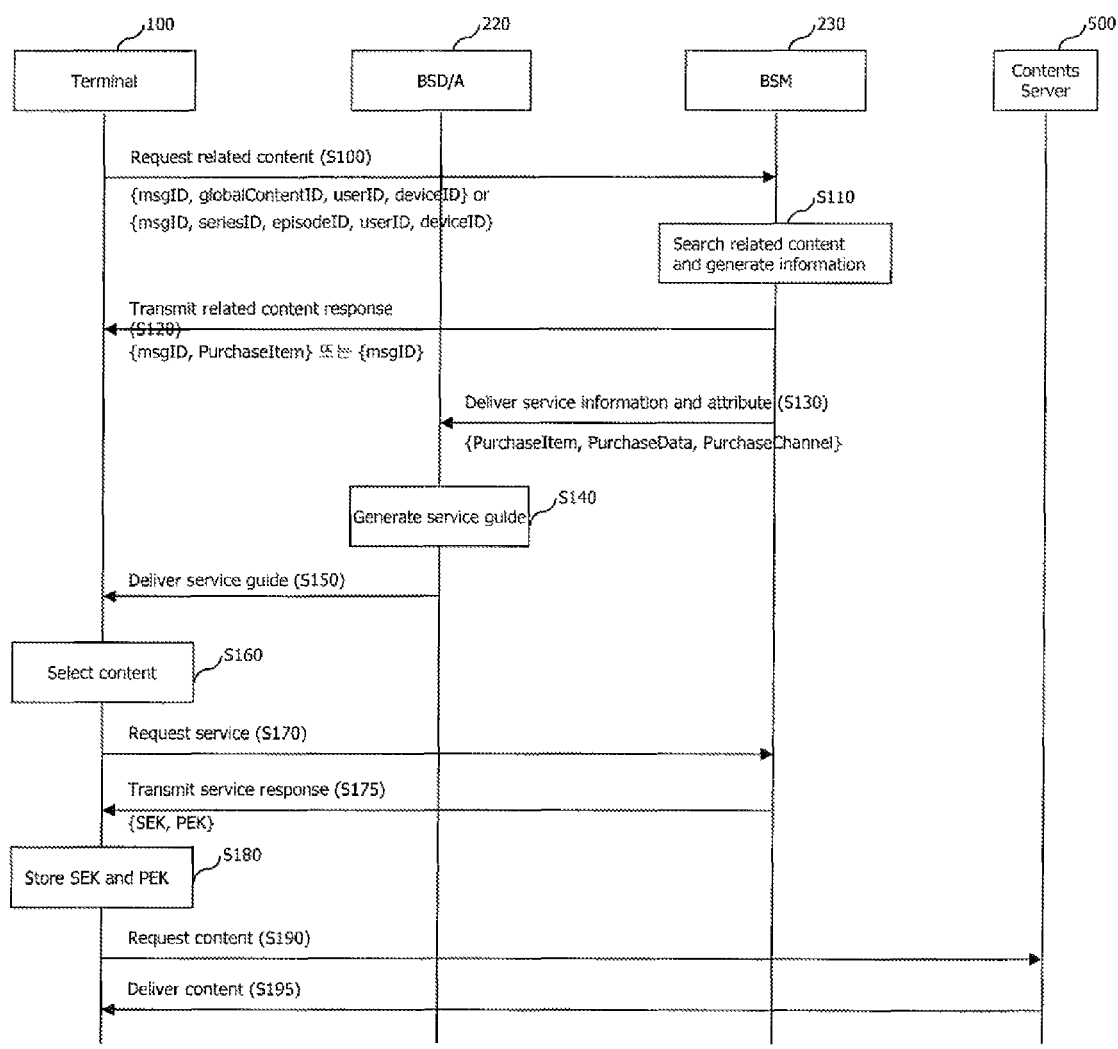
FIG. 4 is a signal flow chart illustrating a processing procedure generated in a system according to an exemplary embodiment of the present invention.

FIG. 4 is a signal flow chart illustrating a processing procedure generated in a system according to an exemplary embodiment of the present invention. As shown in FIG. 4, the procedure includes: a step (S100) of requesting a related content, a step (S110) of searching related contents and generating information, a step (S120) of transmitting related contents in response, a step (S130) of delivering service information and attribute, a step (S140) of generating a service guide, a step (S150) of delivering the service guide, a step (S160) of selecting content, a step (S170) of requesting a service, a step (S175) of delivering a service response, a step (S180) of storing SEK (Service Encryption Key) and PEK (Program Encryption Key), a step (S190) of requesting content, and a step (S195) of delivering content. Each step will now be described hereinafter.

Here, unlike the case as illustrated in FIG. 4, the step (S120) of transmitting related contents in response and the steps (S130 and S140) of delivering service information and attribute and generating a service guide may be performed in reverse order or simultaneously performed.

First, the step (S100) of requesting related contents will now be described.

The user selects a particular content he is interested in. The particular content may be content being viewed by the user via the terminal 100. The terminal includes a service guide with respect to the particular content.

The terminal 100 allows the user to purchase contents related to the content according to a user request (or user command). Namely, in order to request the related contents service, the terminal 100 creates a related contents request message. The related contents request message is to receive purchase information regarding each individual content related to the particular content the user is interested in and the entire related contents, for example, a complete season of particular TV show.

Namely, in order to receive the purchase information regarding each individual content related to the particular content the user is interested in and the entire related contents, for example, a complete season of particular TV show, the terminal 100 creates a related contents request message. The service guide fragment describes content related to the particular content the user is interested in. Information in which the related contents request message may be included will be described hereinbelow.

Information of Related Contents Request Message

The related contents request message may include a globalContentID, a global content identifier of the particular content, a userID, a user identifier known to the BSM 230, a deviceID, an identifier of the terminal 100 known to the BSM 230, and an msgID, a message identifier. The userID may have a value such as IMSI, URI, IMPI, MSISDN, MIN, and the like. The deviceID may have a value such as IMEI, MEID, and the like. The message may be a message requesting purchase information regarding each individual content related to the global content identifier or the entirety of the related contents (namely, a series bundle).

Meanwhile, when the particular content is one of a plurality of episodes of a particular series, the related contents request message may include a seriesID, an identifier of the series, an episodeID, an identifier of the episode of the series, a userID, a user identifier, a deviceID, the device identifier, and an msgID, a message identifier. In this case, the message may be a message requesting purchase information regarding content identified by the seriesID and the episodeID. Also, the message may be a message requesting purchase information regarding the identified content, each individual content related to the identified content, and the entire related contents. Also, when the episodeID is an empty value, the message may be a message requesting purchase information regarding each individual episode of the series or the entire episodes.

The terminal 100 transmits the related contents request message as described above to the BSM 230.

The step (S110) of searching the related contents and generating information will now be described.

When the BSM 230 receives the related contents request message, it checks whether or not the message corresponds with a schema.

Preferably, if the message does not correspond with the schema, the BSM 230 may return a transport protocol level error to the terminal and terminate the procedure.

The BSM 230 searches related contents according to the received related contents request message and generates information regarding the related contents. The information includes information required for creating a related contents response message that corresponds to the related contents request message. A list of the information and its generation method will now be described.

Information Regarding Related Contents 1) refToMsgID

The refToMsgID is an msgID of the related contents request message that corresponds to the related contents response message. Thus, the refToMsgID is created by copying the msgID of the received related contents request message.

2) PurchaseItem, PurchaseData, and PurchaseChannel fragments with respect to content The fragment indicates purchase information regarding each of contents related to the particular content. The BSM 230 determines the related contents through identifiers included in the related contents response message. The example of determining methods according to types of the identifiers is shown in Table below:

TABLE 1

| Included identifier | Method for determining related contents |
| --- | --- |
| GlobalContentID | It's for content related to content indicated by global content identifier. Namely, a content fragment including the global content identifier is searched, and a related content is searched using the content fragment. 'Content related to the content identified by the global content identifier' refers to content related to the content indicated by the global content identifier. |
| SeriesID and episode ID | They are for content to which single content identified by a series identifier and an episode identifier is related. Namely, a content fragment including the series identifier and the episode identifier is searched, and it is the content to which content indicated by the content fragment is related. Alternatively, they are for the single content and content to which the single content is related. Namely, a content fragment including an identifier of the single content is searched, and then a related content is searched through the content fragment. |
| SeriesID | It's for contents of any episodes of a series identified by a series identifier. Namely, content fragments including the series identifier are searched, and it's a content indicated by each of the content fragment. |
| GlobalContentID, seriesID, and episode ID | Priority is given to global content identifier, and can be processed in the same manner as a case where only a global content identifier is included. |

When related contents are determined through the method of Table 1, the BSM 230 searches a content fragment of the related contents. The BSM 230 generates a provisioning service guide fragment with respect to each of the related contents through the contents fragment. The provisioning service guide fragment includes the PurchaseItem, PurchaseData, and PurchaseChannel fragments.

Preferably, the PurchaseItem, PurchaseData, and PurchaseChannel fragments may not be generated for content which cannot be downloaded among the related contents. In this case, whether or not content can be downloaded may be determined through the content fragment of the relevant content.

Namely, the BSM 230 may check whether or not there is any content related to the global content ID included in the request and whether or not the related content is provided as an on-demand service. Upon checking, when the related content exists and is provided as an on-demand service, the BSM 230 transmits a related content response message.

3) PurchaseItem, PurchaseData, and PurchaseChannel fragment with respect to a series bundle.

The fragments indicate purchase information for purchasing the entire contents related to the particular content. Thus, preferably, when only purchase information of single content is requested or when there is only one content related to the particular content, the procedure with respect to the series bundle is not performed and the PurchaseItem fragment with respect to the series bundle may be excluded from the related contents response message.

The BSM 230 calculates a price with respect to the series bundle by using the content fragments of the related contents searched in 2) as described above, and generates the PurchaseItem, PurchaseData, and PurchaseChannel fragments with response to the series bundle. A ContentReference field of the PurchaseItem fragment refers to every content corresponding to the series bundle.

Preferably, when the price is calculated, a price policy of a service provider of the series bundle may be considered.

Preferably, content that cannot be downloaded, among the related contents, may be excluded in calculating price. Also, whether or not content can be downloaded may be determined through the content fragments of the related contents.

4) globalStatusCode

The globalStatusCode indicates a processing result with respect to the transmitted related contents request message.

When the related contents response message includes proper content purchase information, for example, when there is content related to the global content identifier (GlobalContentID) of the related contents request message and the related contents is provided as an on-demand service, the value of the globalStatusCode is 'success. A particular value, for example, '000', may be assigned as a success code indicating the 'success'.

Meanwhile, if the related contents response message does not include proper content purchase information, for example, when the service provider cannot search any related content or when an on-demand service for a searched related content cannot be provided, the value of globalStatusCode is 'error'. A particular value, for example, '22', may be assigned as an error code indicating the 'error'. The error code indicates that the BSM 230 cannot provide an on-demand service of the related content.

Additionally, the case where the related contents response message does not include proper content purchase information may include a case where content identified by identifier(s) in the related contents request message does not exist, a case where there exists identified content but there is no content related to it, a case where there exists the related content but no content cannot be downloaded via interactive channel, and the like.

When the terminal 100 receives the related contents response message having the value of globalStatusCode as 'error', the procedure is terminated.

The step (S120) of transmitting the related contents in response will now be described.

The BSM 230 creates the related contents response message corresponding to the related contents request message by using the above-described information.

Basically, the related contents response message has an msgID field, a message identifier.

When the related contents response message delivers the related contents purchase information, the related contents response message may have a PurchaseItem field. The PurchaseItem field includes information for receiving a service guide which includes every information of the related contents. In this case, the PurchaseItem field is filled by using the PurchaseItem fragment with respect to the above-described content and the PurchaseItem fragment with respect to the series bundle.

Also, the related contents response message has the globalStatusCode indicating a processing result with respect to the received related contents request message.

Also, selectively, in the step (S170) of delivering the service guide, the BSD/A 220 may transmit ServiceGuideDeliveryUnit including information regarding the entire service guide or ServiceGuideDeliveryDescriptor allowing for accessing a particular service guide to the terminal 100 in a push manner via the interactive channel. In this case, information corresponding to the PurchaseItem fragment may be obtained through the ServiceGuideDeliveryUnit or the ServiceGuideDeliveryDescriptor. Thus, in this case, the related contents response message may include only msgID. The ServiceGuideDeliveryUnit and the ServiceGuideDeliveryDescriptor will be described later.

The step (S130) of delivering the service information and attribute will now be described.

In step (S130), the BSM 230 informs the BSD/A 200 that it must prepare a service fragment in order for the BSD/A 200 to respond to a request from the service guide fragments from the terminal 100 (The BSM shall inform the BSD/A to prepare for the service guide fragments, so that the BSD/A can response to request of the Service guide fragments from the terminal).

For example, the BSM 230 transmits price information and purchase information related to each of the related contents and the series bundle to the BSD/A 220.

Preferably, the price information and the purchase information may include the PurchaseItem, the PurchaseData, and the PurchaseChannel fragments.

Preferably, the PurchaseItem, the PurchaseData, and the PurchaseChannel fragments may be included in a payload object and transmitted.

The step (S140) of generating the service guide will now be described.

The BSD/A generates a service guide to be transmitted to the terminal 100 by using the information transmitted in the step (S130) of delivering the service information and attribute. The service guide may include information for downloading content.

An example of generation of the service guide is shown in Table 2 below. Table 2 describes the fragments to be generated and methods for generating the fragments.

TABLE 2

| Fragment | Generation method |
| --- | --- |
| Service fragment for series bundle (It is generated when there is purchase information regarding series bundle) | ServiceType field: It has 1 (Basic TV). validFrom, validTo fields are not included because there is no time restriction to downloading. |
| Schedule fragment for series bundle (It is generated when there is purchase information regarding series bundle) | It indicates every content fragment of series bundle. defaultSchedule: it has a true value |
| Schedule fragment for each content fragment | onDemand field: it has a true value Service Reference: It has a server reference value of a content fragment. defaultSchedule field: It is not included when there is purchase information regarding series bundle. It has a true value when there is no purchase information regarding series bundle. validFrom, validTo fields are not |

TABLE 2-continued

| Fragment | Generation method |
|---|---|
| | included because there is no time restriction to downloading. |
| Access fragment for each schedule fragment | AccessType field: It has a UnicastServiceDelivery value. AccessServerURL field: It has information of a URL from which content can be downloaded |

Figure 5:
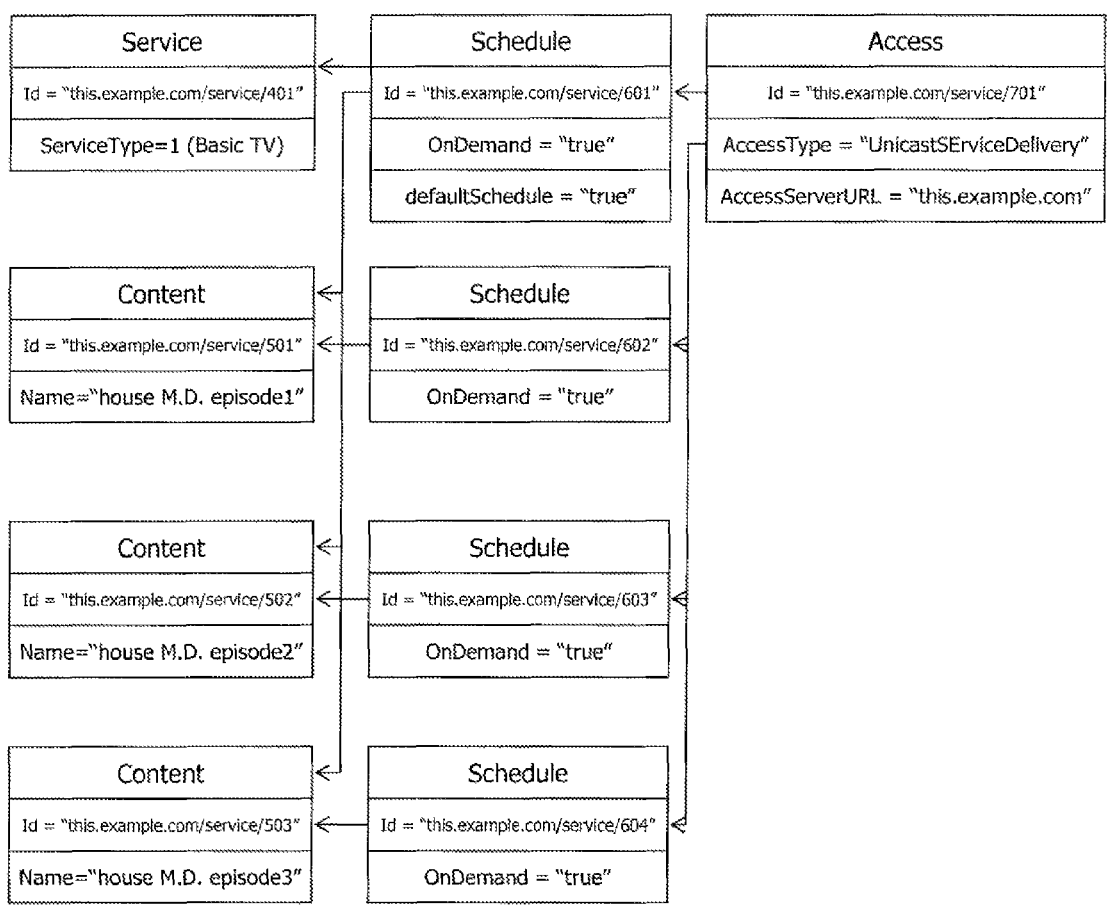
FIG. 5 illustrates the relationship of fragments in the service guide according to an exemplary embodiment of the present invention.

FIG. 5 illustrates the relationship of fragments in the service guide according to an exemplary embodiment of the present invention.

The step (S150) of delivering the service guide will now be described.

The terminal 100 receives the service guide from the BSD/A 220.

Preferably, when the terminal 100 supports an OMA push, a WAP push, or an SIP push, the BSD/A 220 can transmit the service guide to the terminal 100 in a push manner.

Preferably, when the related contents response message does not include the PurchaseItem, the BSD/A 220 may transmit the ServiceGuideDeliveryDescriptor or the ServiceGuideDeliveryUnit with respect to the service guide to the terminal 100 in the push manner. If ServiceGuideDeliveryDescriptor is transmitted to the terminal 100, the terminal 100, using the information given from the ServiceGuideDeliveryDescriptor, may obtain the ServiceGuideDeliveryUnit via interactive channel. Detailed description of this procedure is specified in the FIG. 10 description.

The step (S160) of selecting content will now be described.

The terminal 100 displays information required for purchasing contents such as the price of each individual related contents, the series bundle, and the like. The user selects content desired to be purchased through the displayed information. Purchasing of content may refer to a subscription to a particular service for the user.

The step (S170) of requesting a service will now be described.

The terminal 100 generates a service request message indicating the purchase of particular content according to the selection, and transmits the message to the BSM 230.

The service request message includes information for obtaining an SEK (Service Encryption Key) and a PEK (Program Encryption Key) with respect to the content selected by the user from the BSM 230.

Preferably, the information may include msgID, an identifier of the service request message, userID, a user identifier, a deviceID, a device identifier, and PurchaseItem with respect to the selected content. Also, preferably, the PurchaseItem may include an identifier with respect to the selected content, a monetary unit desired to be used by the user for payment, and price.

The step (S175) of delivering a service response message will now be described.

According to the received service request message, the BSM 230 generates a service response message including the SEK and the PEK with respect to the content selected by the user and delivers the message to the terminal 100.

Preferably, when the service request message does not correspond with a schema, the BSM 230 may return a transport protocol level error to the terminal 100 and terminate the procedure.

Preferably, the service response message may include information shown in Table 3 below:

TABLE 3

| Information | Meaning |
|---|---|
| refToMsgID | It is msgID of a service request message corresponding to a service response message |
| globalStatusCode | It indicates a status of the service response message In case of a valid service response message, it has a success value, and when there is an error, it has an error value. The examples of the case including error are as follows: 1) Whether or not a service is allowed for a terminal and a user has been authenticated by using devID and userID, but the authentication fails. 2) When there is no record corresponding to devID, userID, and PurchaseItem. |
| PurchaseItem | A new field indicating that purchase or subscription is made in PurchaseItem record included in the service request message is added. |
| SEK and PEK | SEK is an SEK with respect to a service. Preferably, the service may be a service identified by an identifier of a service fragment. PEK is a PEK with respect to content. Preferably, the content may be content identified by the identifier of a content fragment, or a program identified by an identifier of a schedule fragment. |

The step (S180) of storing the SEK and PEK will now be described.

Upon receiving the service response message, the terminal 100 stores the SEK and PEK included in the message.

Preferably, the terminal checks whether or not the service response message corresponds with the schema, and if the service response message does not correspond with the schema, the terminal 100 may inform the user that there is an error, and terminate the procedure.

The step (S190) of requesting content and the step (S195) of delivering content will now be described.

The terminal 100 requests transmission of the content from the content server 500 that stores the selected content. The terminal receives the requested content from the content server 500.

Preferably, the transmission may be downloading through an HTTP (Hypertext Transfer Protocol) or streaming through an RTSP (Real Time Streaming Protocol).

Preferably, the terminal 100 identify (discriminate, or recognize) a Web address with respect to the content server and the content by using an accessServer URL field in an access fragment and a contentLocation field in the schedule fragment of the service guide.

Figure 6:
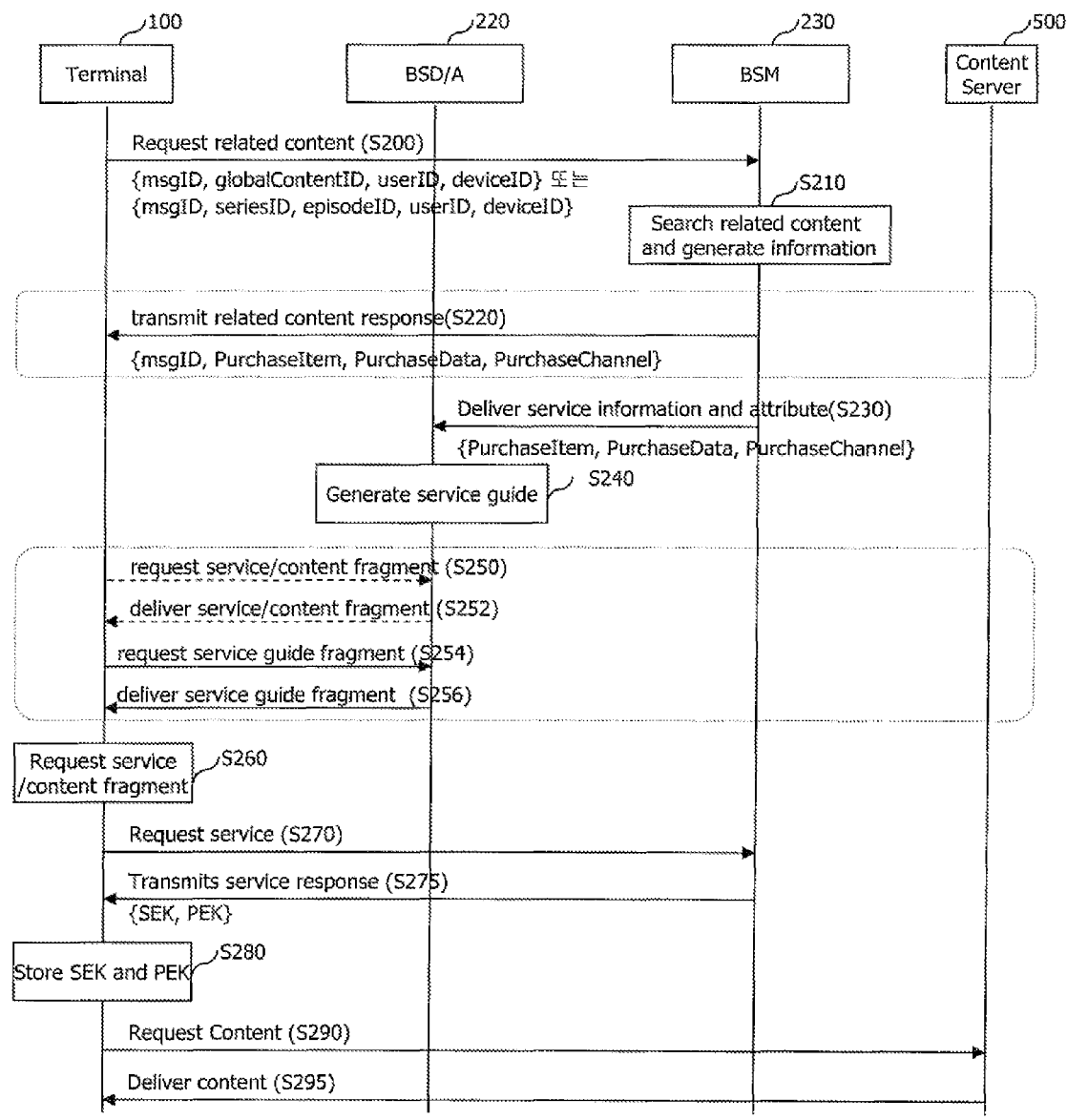
FIG. 6 is a signal flow chart illustrating a processing procedure generated in the system according to an exemplary embodiment of the present invention.

FIG. 6 is a signal flow chart illustrating a processing procedure generated in the system according to an exemplary embodiment of the present invention.

The exemplary embodiment illustrated in FIG. 6 has the following features compared with the exemplary embodiment illustrated in FIG. 4. That is, first, a related contents response message received by the terminal 100 includes the provisioning service guide fragments, namely, the PurchaseItem, PurchaseData, and PurchaseChannel fragments (S220). Also, in the present exemplary embodiment, the terminal 100 communicates with the BSD/A 220 via an interactive channel. The terminal 100 requests only a particular portion required by the terminal 100, rather than the entire service guide, from the BSD/A 220 via the interactive channel (S254), and receives only the particular portion according to the request (S256).

Hereinafter, the processing procedure of the system according to the exemplary embodiment illustrated in FIG. 6 will now be described.

First, a step (S200) of requesting related contents and a step (S210) of searching related contents and generating information correspond to the step (S100) of requesting related contents and the step (S110) of searching related contents and generating information, respectively, in FIG. 4. The repeated description of the steps will be omitted.

Next, the step (S220) of delivering a content response includes the content described in the corresponding step (S120) in FIG. 4. Also, the related contents response message in step S220 includes the provisioning service guide fragments, namely, the PurchaseItem fragments, the PurchaseData fragments, and the PurchaseChannel fragments, as well as the PurchaseItem field. Each fragment is generated through a corresponding fragment generated in the step (S210) of searching related contents and generating information.

The service guide fragment may provide both an on-demand service of each individual content and an on-demand service of bundled contents.

If the global status code has the value of success code, for example, '000', the service guide fragment includes one or more of the PurchaseItem fragment, PurchaseChannel fragment, and PurchaseData fragment.

Next, a step (S230) of delivering service information and attribute and a step (S240) of generating a service guide correspond to the step (S130) of delivering service information and attribute and the step (S140) of generating a service guide, respectively. The repeated description of the steps will be omitted.

And then, the terminal 100 checks whether there is a service fragment or content fragment corresponding to the ServiceID element or ContentID element of the PurchaseItem field in the terminal 100. If the service fragment or content fragment does not exist, the terminal 100 requests transmission of the service fragment or the content fragment from the BSD/A 220 (S250) and receives the service fragment or the content fragment from the BSD/A 220 (S252).

When the service fragment or the content fragment referred to by the ServiceID element or the contentID element are furnished in the terminal 100, the terminal 100 checks whether or not there is a service guide fragment referred to by the service fragment or the content fragment in the terminal 100. If there is any service guide fragment associated with the service fragment or the content fragment that are not stored in the terminal 100, the terminal 100 requests transmission of the service guide fragment from the BSD/A 220 (S254) and receives the service guide fragment from the BSD/A 220 (S256). Through the above-described steps S250, S252, S254, and S256, the terminal 100 can obtain the service guide fragment or the like with respect to the content associated with the PurchaseItem.

Thereafter, the follow-up steps S260, S270, S275, S280, S290, and S295 correspond to the steps S160, S170, S175, S180, S190, and S195 described above with reference to FIG. 4, respectively. Thus, a repeated description of the steps will be omitted.

Figure 7:
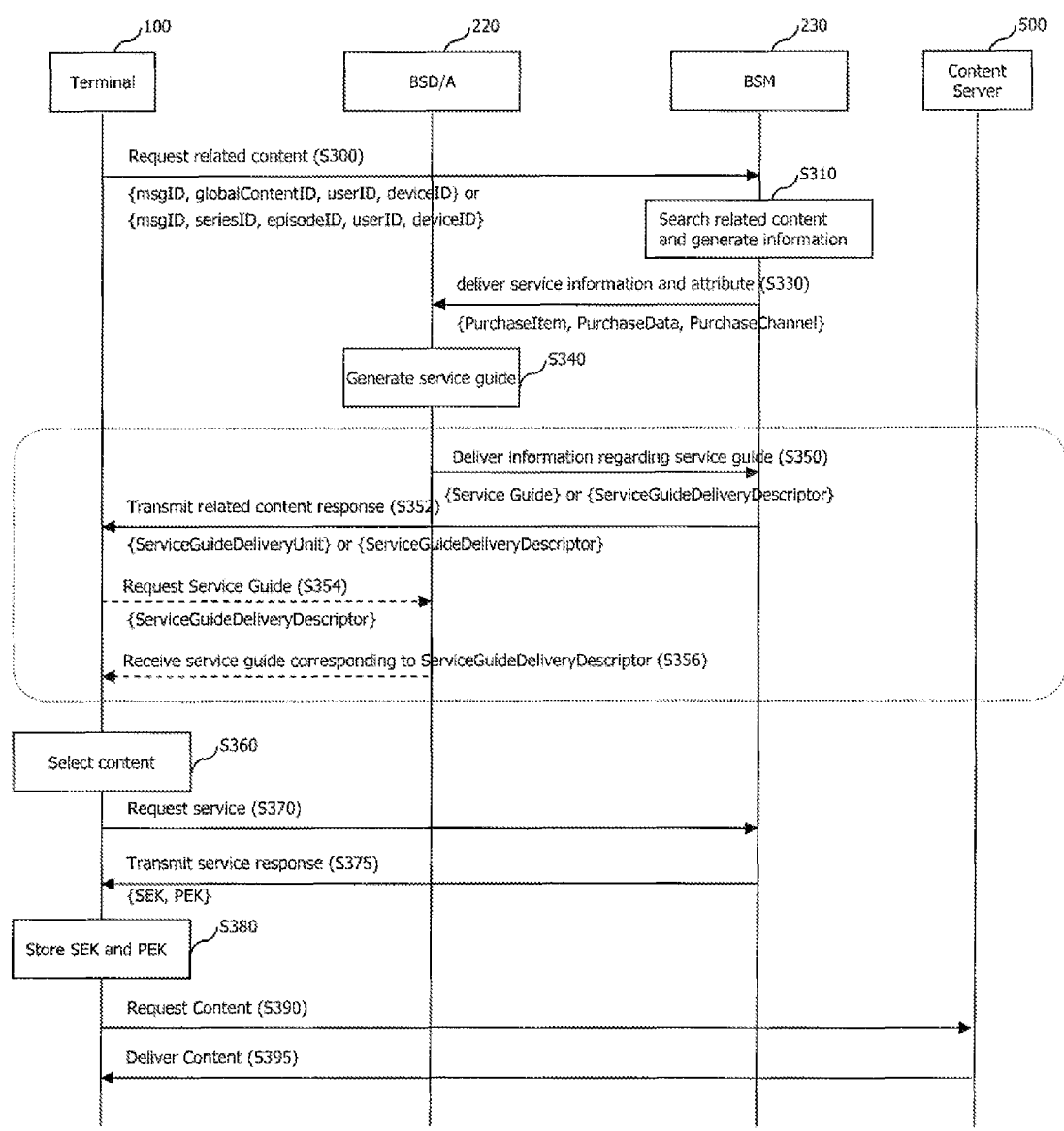
FIG. 7 is a signal flow chart illustrating a processing procedure generated in the system according to an exemplary embodiment of the present invention.

FIG. 7 is a signal flow chart illustrating a processing procedure generated in the system according to an exemplary embodiment of the present invention.

Compared with the exemplary embodiment illustrated in FIG. 4, the exemplary embodiment illustrated in FIG. 7 has a feature that a step (S340) of generating a service guide is performed before a step (S352) of delivering a related contents response. This is because the related contents response message includes information regarding the service guide.

Preferably, the related contents response message may include ServiceGuideDeliveryUnit including the service guide.

Or, preferably, the related contents response message may include ServiceGuideDeliveryDescriptor allowing the terminal 100 to receive a particular service guide via an interactive channel from the BSD/A 220.

Hereinafter, a processing procedure of the system according to the exemplary embodiment illustrated in FIG. 7 will now be described.

First, a step (S300) of requesting related contents, a step (S310) of searching related contents and generating information, a step (S330) of delivering service information and attribute, and a step (S340) of generating a service guide correspond to the steps S100, S110, S130, and S140 described above with reference to FIG. 4, respectively. In this case, however, there is no step corresponding to the step (S120) of delivering a related contents response in FIG. 4. A repeated description of the steps will be omitted.

Next, the BSD/A 220 generates information related to the service guide and then transmits the information to the BSM 230 (S350). The BSM 350 transmits a related contents response message including the information to the terminal 100 (S352). The terminal 100 can obtain the service guide itself through the related contents response message or obtain information required for obtaining the service guide from the BSD/A 220.

Preferably, the information transmitted by the BSD/A 220 to the BSM 230 may be the ServiceGuideDeliveryUnit including the generated service guide (S350). In this case, the terminal 100 can obtain all the information required for purchasing the particular content through the related contents response message, so it does not need to receive a service guide additionally.

Preferably, the information may be the ServiceGuideDeliveryDescriptor allowing for referring to the generated service guide in the BSD/A 220 (S350). In this case, the related contents response message may include only the ServiceGuideDeliveryDescriptor, not the service guide (S352). Thus, in order to obtain the required actual service guide, the terminal further includes a step (S354) of requesting the service guide from the BSD/A 220 by using the ServiceGuideDeliveryDescriptor, and a step (S356) of receiving a service guide corresponding to the ServiceGuideDeliveryDescriptor from the BSD/A 220. In order to allow for the request and reception, the terminal 100 and the BSD/A 220 may communicate via an interactive channel.

Next, the follow-up steps S360, S370, S380, S390, and S395 correspond to the steps S160, S170, S175, S180, S190, and S195 described above with reference to FIG. 4, respectively. Thus, a repeated description of the steps will be omitted.

Figure 8:
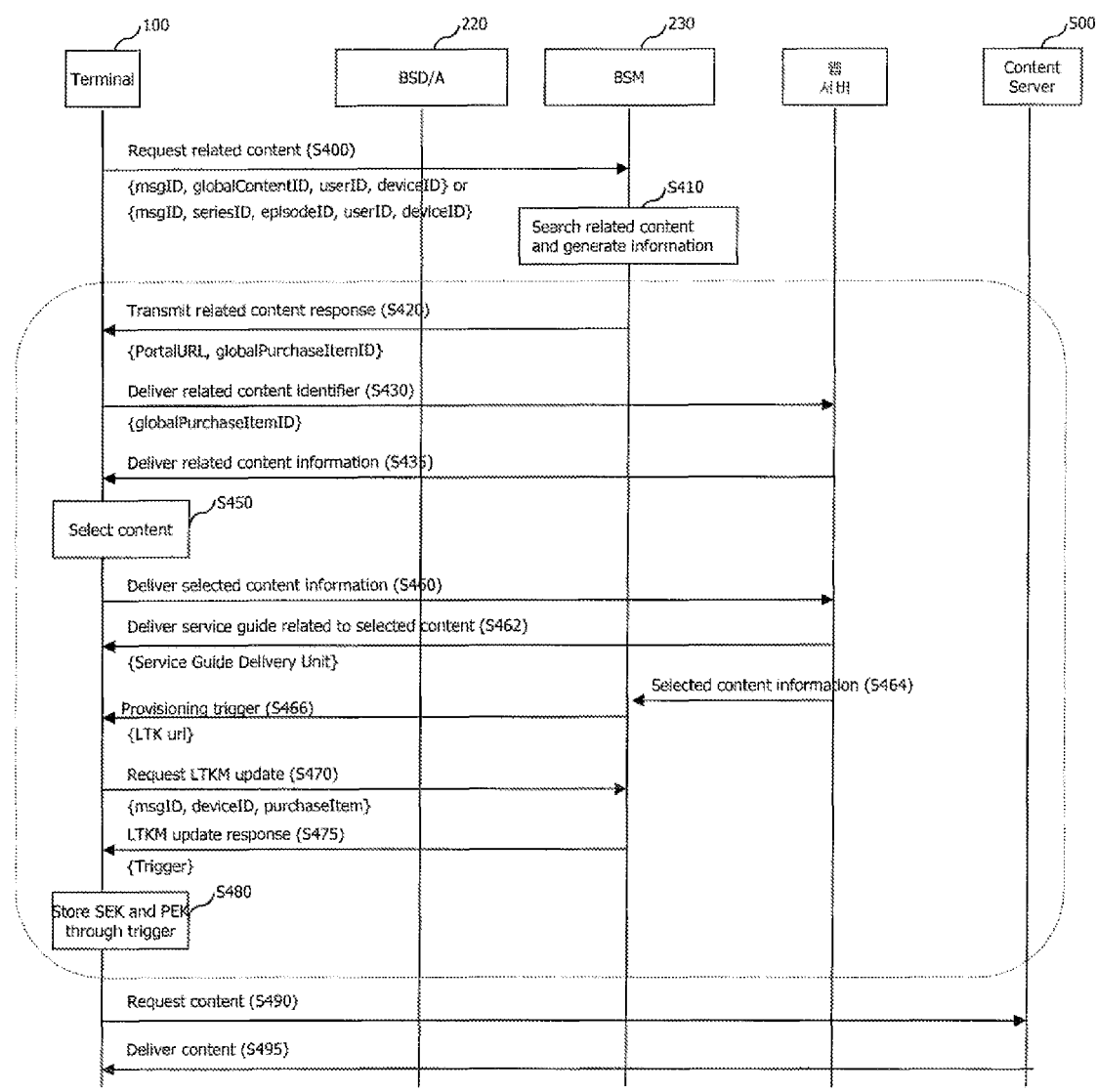
FIG. 8 is a signal flow chart illustrating a processing procedure generated in the system according to an exemplary embodiment of the present invention.

FIG. 8 is a signal flow chart illustrating a processing procedure generated in the system according to an exemplary embodiment of the present invention.

Compared with the exemplary embodiment illustrated in FIG. 4, the exemplary embodiment illustrated in FIG. 8 has a feature that related contents is selected based on a Web service. Namely, a system according to the present exemplary embodiment includes a Web server as an additional element.

A processing procedure of the system according to the exemplary embodiment illustrated in FIG. 8 will now be described.

First, a step S400 of requesting related contents and a step (S410) of searching related contents and generating information correspond to the steps S100 and S110 as described above with reference to FIG. 4, respectively Thus, a repeated description of the steps will be omitted.

Next, the BSM 230 creates a related contents response message. The related contents response message includes information required for accessing the Web server and information required for the Web server to identify the related contents.

Preferably, the information required for accessing the Web server may be a PortalURL, an address of the Web server, and the information required for the Web server to identify the related contents may be globalPurchaseItemID. In this case, the globalPurchaseItemID is an identifier of the PurchaseItem.

The BSM 230 transmits the created related contents response message to the terminal 100 (S420).

The terminal 100 accesses the Web server through the information in the related contents response message and transmits identifiers (or IDs) of the related contents (S430).

Preferably, the accessing may be made through a Web browser, and the Web browser may designate the address of the Web server by using the PortalURL. Also, the terminal 100 may transmit the IDs of the related contents to the Web server by using a method of filling the globalPurchaseItemID in an HTTP Post request message.

The Web server generates related contents information based on the related contents identifier and transmits the related contents information to the terminal 100 so that the user can select the related contents (S435).

Preferably, the information may be configured by a Web page, and the transmission may be a Web page response to the request from the terminal 100.

Next, the user of the terminal 100 selects content desired to be purchased through the related contents information (S450), and the terminal 100 transmits information regarding the selection to the Web server (S460).

The Web server identifiers the content selected by the user through the information regarding the selection.

After the identifying, the Web server transmits a service guide connected with the selected content to the terminal 100, and the terminal 100 stores the received service guide (S462). Preferably, the service guide may be transmitted through the ServiceGuideDeliveryUnit.

Also, after the identifying, the Web server transmits the information regarding the selected content to the BSM 230 (S464).

And then, in order to allow the terminal 100 to receive an LTK (Long Term Key) with respect to the selected content, the BSM 230 transmits a provisioning trigger message to the terminal 100 (S466). Preferably, the message may include a URL allowing for receiving of the LTK. Also, preferably, the transmission of the message may be made through an SMS (Short Message Service).

Upon receiving the provisioning trigger message, the terminal 100 transmits an LTKM (Long Term Key Message) renewal (or update) request message to the BSM 230 in order to obtain the LTK with respect to the selected content (S470). Preferably, the message may include the purchaseItem of the selected content. Also, preferably, the message may include msgID, namely, an identifier of the message, and device ID, namely, a device identifier.

Next, the step (S475) of delivering an LTKM renewal response will now be described.

In response to the LTKM renewal request message received from the terminal 100, the BSM 230 generates an TLKM renewal response message including an SEK and a PEK with respect to the content selected by the user and transmits the message to the terminal 100 (S480).

Preferably, if the LTKM renewal request message does not correspond with a schema, the BSM 230 may return a transport protocol level error to the terminal and terminate the procedure.

Preferably, the LTKM renewal response message may include information as shown in Table 4 below:

[Table 4]

TABLE 4

| Information | Meaning |
| --- | --- |
| refToMsgID | It is msgID of the LTKM renewal request message corresponding to the LTKM renewal response message |
| globalStatusCode | It indicates the state of the LTKM renewal response message. In case of a valid LTKM renewal response, it has a success value, and when there is an error, it has an error value. The case where there is an error is as follows: 1) When the user does not have a use authority to none of the selected contents. |
| PurchaseItem | It is generated in the same manner as the PurchaseItem transmitted through the LTKM renewal request message. Preferably, it can indicate a use authority of the user by using an ItemwiseStatusCode element. Namely, when the user can use the selected content connected with the PurchaseItem, the itemwiseStatusCode has a success value, or otherwise, it has an error value. |
| Trigger | It includes the SEK and the PEK |

The terminal 100 receives the LTKM renewal response message (S475), extracts the SEK and the PEK with respect to the selected content in the LTKM renewal response message, and stores the same (S480). Preferably, the terminal 100 can extract the SEK and the PEK through a trigger in the LTKM renewal response message.

Next, the follow-up steps S490 and S495 correspond to the steps S190 and S195 described above with reference to FIG. 4, respectively. Thus, a repeated description of the steps will be omitted.

Table 5 shown below describes a different exemplary embodiment with respect to the related contents request message and parameters of the message. The related contents request message allows the service provider to recommend content related to the content the user is interested in. The matters regarding the related contents request message described in Table 5 may be combined with different exemplary embodiments as described above and used.

TABLE 5

| Name | Description |
| --- | --- |
| Related contents request (RelatedContentRequest) | It is a related contents request message for obtaining service guide information regarding content related to the content the user is interested in. The message may include the following attribute: A request identifier (requested) The message may include the following elements: A user identifier (UserID), a device identifier (DeviceID), a broadcast roaming specific part (BroadcastRoamingSpecificPart), and a global content identifier (GlobalContentID) |
| Request identifier (requested) | It is an identifier of the related contents request message |
| User identifier (UserID) | It is a user identifier known to the BSM. In case of a DRM (Digital Rights |

TABLE 5-continued

| Name | Description |
|---|---|
| | Management), this element is included.<br>In case of a smart card (Smartcard) profile, this element must be omitted, and user identifying is provided through an HTTP digest authentication procedure.<br>The element may include a type attribute, The type attribute specifies a type of the user identifier and may have values such as a user name, IMSI, URI, IMPI, MSISDN, MIN, and the like, following the RFC 2865 document. |
| Device identifier (DeviceID) | It is a unique device identifier known to the BSM.<br>In a DRM profile, this element is included when the device supports IMEI or MEID. The device supporting the DRM profile does not allow the user to modify the device identifier. The element may include a type attribute. The type attribute specifies the type of a device identifier and may have a value such as IMEI (See 3GPP TS 23.00 document), MEID (See 3GPP2 C.S0072 document), and the like. |
| Broadcast roaming specific part (BroadcastRoamingSpecificPart) | The element provides information that helps process the related contents request message.<br>When the BSM supports broadcast roaming, the BSM supports this element.<br>When the terminal supports broadcast roaming, the terminal supports this element. |
| Home BSM (HomeBSM) | When a service provisioning request is issued for a visited BSM, this element indicates a home BSM of the terminal in a context of the request. |
| Visited BSM (VisitedBSM) | When a service provisioning request is issued for a home BSM, this element indicates a visited BSM from which the user wants to purchase a service. |
| Global content identifier (GlobalContentID) | It is a globally unique identifier of content, an interested target. The terminal transmits this value to receive information related to the related contents. |

Table 6 shown below describes different exemplary embodiment with respect to the related contents response message and parameters of the message. The related contents response message is used for the user to request a service guide fragment for the related contents. The matters regarding the related contents request message described in Table 6 may be combined with different exemplary embodiments as described above and used.

TABLE 6

| Name | Description |
|---|---|
| Related contents response (RelatedContentResponse) | It is a related contents response message.<br>It may include the following attributes:<br>A request identifier (requested), a global status code (globalStatusCode), an expiration time (expirationTime)<br>It may include the following element:<br>A purchase item (PurchaseItem) |
| Request identifier (RequestID) | It is an identifier of a corresponding related contents request message |
| Global status code (globalStatusCode) | It follows a defined return code as a result of a request |
| Expiration time (expirationTime) | The purpose of the attribute is to inform the terminal that a purchase item fragment received through provisioning of the related contents response message is due to be up-to-date from a value of at least current response time to a value of the expiration time.<br>If the expiration time exists, the terminal, which wants to track renewal of the received purchase item, cannot renew the request until when the expiration time arrives unless there is further instruction.<br>This field is expressed as a first 32-bit integer part of an NTP (Network Time Protocol) time stamp. |
| Purchase item (PurchaseItem) | It describes purchase related information regarding a purchase item related to content requested in the related contents response message.<br>This element can provide one or more prices according to the currency of the purchase item.<br>This element includes the global status code attribute, and if the value of the global status code is different from 0, this element should not be instantiated. In other cases, the element should be instantiated.<br>It allows inclusion of both instances of 'PurchaseDataReference' and 'PurchaseDataFragment' in the same response.<br>This element may include following elements: PurchaseItemFragment, PurchaseDataReference, PurchaseDataFragment. |
| Purchase item fragment (PurchaseItemFragment) | It describes purchase related information including reference with respect to a service or a content fragment.<br>This element includes a purchase item fragment. |
| Purchase data reference (PurchaseDataReference) | It describes a purchase related option available for the user.<br>This element may include following attribute: identifier reference (idRef)<br>This element may include following elements: price, SubcriptionPeriod, SubscriptionType, TermsOfUse. |
| Identifier reference (idRef) | It is an identifier of the purchase data and is used to refer to purchase data in a subsequent service request message. |
| Price | It is price information regarding a purchase item the user wants to know about. This element has priority over a monetary price element of a referred purchase data fragment.<br>This element may include following element: validTo, currency |
| ValidTo | It refers to a final time point at which the price information is valid. If this element is not given, it is assumed that the price information is valid until when a non-defined time point in the future.<br>This field is expressed by a first 32-bit integer part of the NTP time stamp.<br>The validity indicated by this element may be the same as or within the range of a fragment validity of a connected purchase data fragment. |
| Currency | It specifies a currency code defined in ISO (International Organization for Standardization) 4217 international currency code. |
| Subscription period (SubscriptionPeriod) | It specifies a subscription period with respect to an option indicated by the purchase data. |

TABLE 6-continued

| Name | Description |
|---|---|
| | When the purchase item does not indicate a bundle of services, this subscription period should be returned. Or otherwise, it may be omitted. This element has priority over a purchase period element of a referred purchase data fragment. |
| Start time (startTime) | Time start attribute gives a start time point of the subscription period. This field is expressed by a first 32-bit integer part of the NTP time stamp. |
| Subscription type (SubscriptionType) | A value allowed as a subscription type includes the following: one-time subscription, open-ended subscription, a free trial subscription. A token-based mode defined in the purchase data fragment cannot be signaled here. |
| TermsOfUse | It is an element declaring that there is terms of use connected with a purchase data fragment related to the related contents response and a parent purchase item. It includes reference with respect to textual presentation regarding the terms of use or reference with respect to representation through preview data, and includes information regarding whether a user consent is required for the terms of use. Multiple occurrences of the terms of use in the message is allowed. However, in two certain such occurrences, values of country and language elements should not be the same concurrently. This element may include following attributes: type, identifier (id), a user content required (userConsentRequired). This element may include following sub-elements: Country, language, preview data identifier reference (PreviewDataIDRef), text of terms of use (TermsOfUseText). |
| Type | It is a method for the terminal to interpret the terms of use. When the value of this element is 0, it means that the terms of use should be indicated before purchase or subscription. If there is terms of use whose type if 0, the terminal should indicate the terms of use before initiating a request of purchase or subscription related to a purchase item connected with the message. |
| Identifier (id) | It is a URI (Uniform Resource Identifier) that solely identifies the terms of use. |
| User consent required (userConsentRequired) | It indicates whether or not a user consent is required for such terms of use. When the element value is true, a user consent regarding such terms of use in the subscription/purchase request message related to the purchase item connected with the message is required. When the value is false, a user consent with respect to the terms of use is nor required. |
| Country | It is a list of countries to which the terms of use can be applicable when consumption of the service is made in a certain country. Each value is a mobile country code according to an ITU-MCC. If this element is omitted, the terms of use can be applicable to a certain country. |
| Language | It is a language given to the terms of use. The value of this element is a three character string in conformity with an ISO 639-2 alpha standard for a language code. |
| Preview data identifier reference (PreviewDataIDRef) | It refers to the preview data fragment delivering representation of legal text. If this element does not exist, the text element of terms of use should exist (implemented in XML schema by using <choice>) |
| Text of terms of use (TermsOfuseText) | It is text of terms of use to be indicated. If this element does not exist, the preview data identifier reference element should exist (implemented in XML schema by using <choice>) |
| Purchase data fragment (PurchaseDataFragment) | It describes purchase related information including price information and terms of use. This element includes a purchase data fragment. |

A method of searching and downloading content using the related contents request message described in Table 5 and the related contents response message described in Table 6 will now be described.

Figure 9:
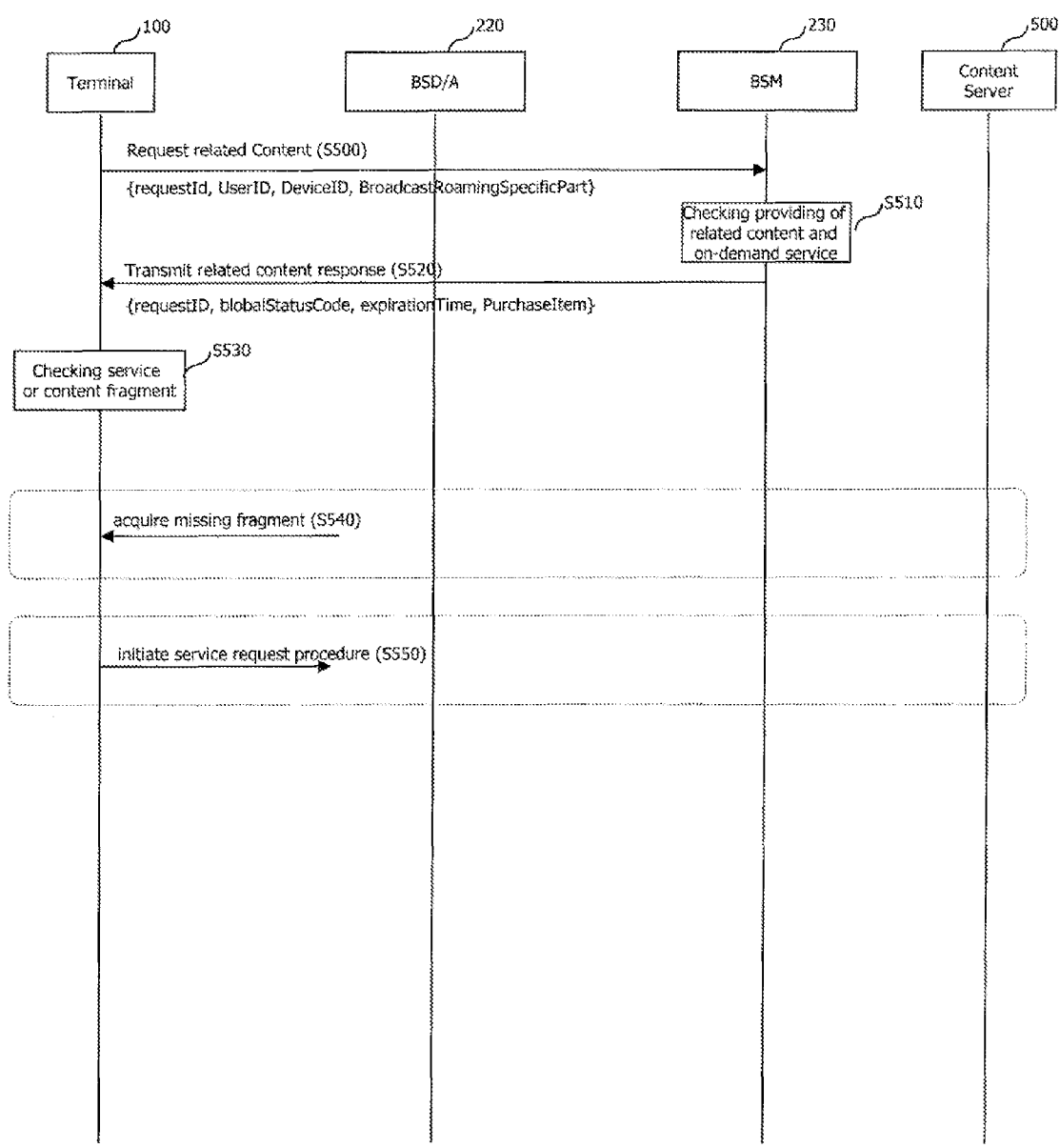
FIG. 9 is a flow chart illustrating the procedure of an inquiry of related contents using a related contents request message and a related contents response message.

FIG. 9 is a flow chart illustrating the procedure of an inquiry (or reference) of related contents using a related contents request message and a related contents response message.

The related contents inquiry allows the service provider to offer a recommendation to the user according to a user preference. In this relationship, the expression of 'one content and other content are related' means that the two contents are similar in their substance or subject matter. Also, the relation between the different contents may be determined by the service provider.

In order to request the content service, the terminal 100 transmits the related contents request message to the BSM 230 (S500). The related contents request message is transmitted to obtain a complete set of service guide information allowing the user to purchase an on-demand service of content related to the content the user is interested in. The related contents request message may have the parameters as shown in Table 5 above.

Next, the BSM 230 transmits the related contents response message to the terminal 100 in order to provide the result of the related contents request (S510). The related contents response message may have such parameters as shown in Table 6 above. If there is content related to the content included in the request and the related contents is provided as an on-demand service, the BSM 230 includes a service guide fragment provision and transmits the related contents response message having the success code of '000' in the global status code. The service guide can provide both an on-demand service of an individual content and an on-demand service of bundled contents.

When the global status code has the value '000', the related contents response must include one or more purchase item fragments and purchase data fragments. If the terminal 100 does not have the service fragment or the content fragment referred to by the purchase item fragment, the terminal 100 acquires the missing fragment (S520). The detail process of acquiring a missing fragment has been described above in detail with reference to FIGS. 4, 6, 7, and 8. After acquiring the required service guide fragment, the terminal 100 starts a service request procedure by using the information in the received purchase fragment (S530). The matters related to the service request procedure have been described above in detail with reference to FIGS. 4, 6, 7, and 8. If the service provider cannot find any related contents or when an on-demand service for discovered related contents cannot be provided, the BSM 230 includes an error code '22' indicating that the on-demand service with respect to the related contents cannot be provided to the user in the global status code, and transmits the related contents response message.

Figure 10:
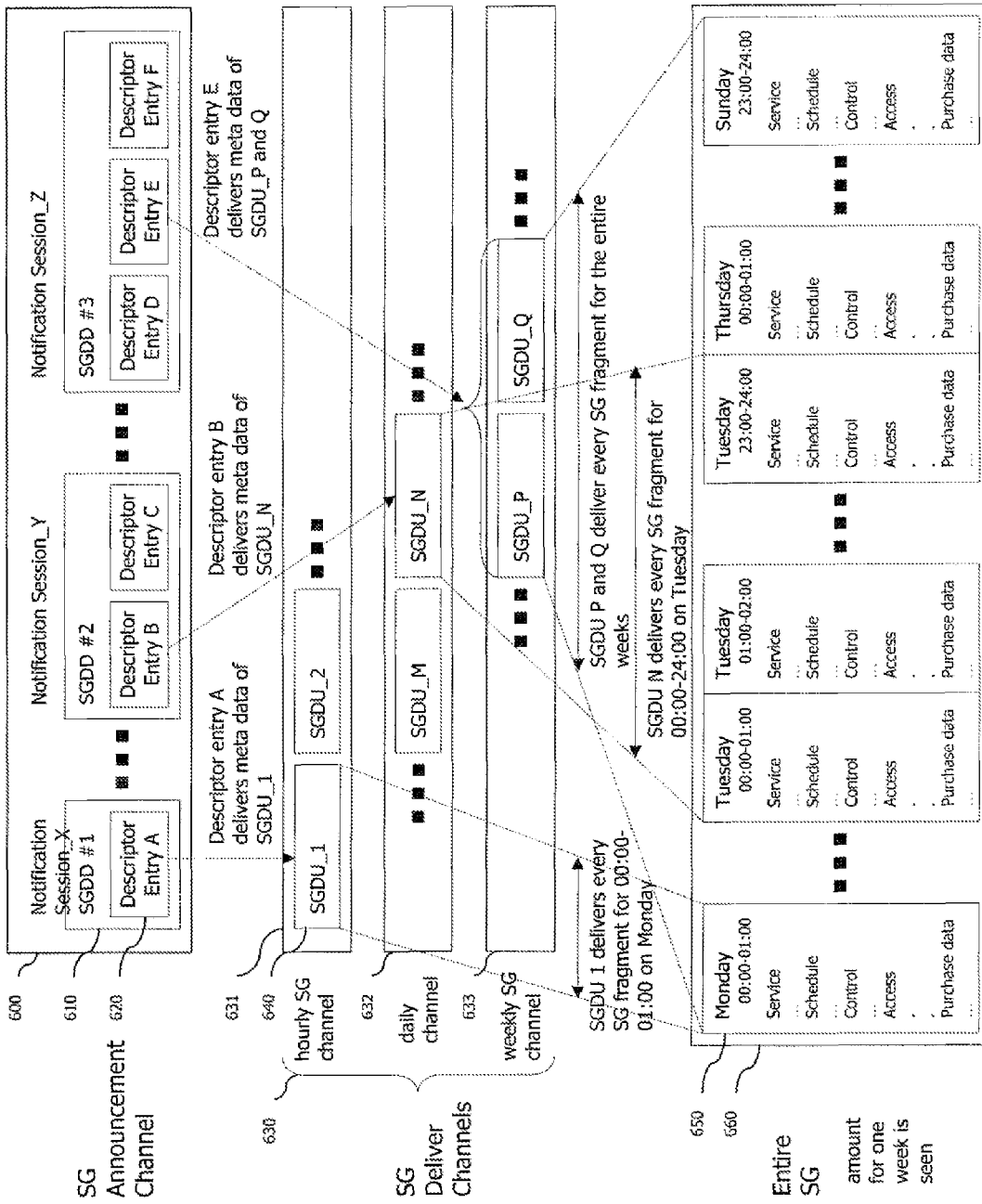
FIG. 10 illustrates the method of receiving a service guide by the terminal from the server according to an exemplary embodiment of the present invention.

FIG. 10 illustrates the method of receiving a service guide by the terminal from the server according to an exemplary embodiment of the present invention.

The terminal receives a service guide delivery descriptor (SGDD) 610 via an SG (Service Guide) announcement channel 600. The service guide delivery descriptor 610 includes a descriptor entry (or a description entry) 620, and the descriptor entry indicates a service guide delivery unit 640 in a service guide delivery channel 630. The SG channel may be hourly SG channel 631, daily SG channel 632, and weekly SG channel 633.

And then, the terminal receives the service guide delivery unit 650 via the service guide delivery channel 630. The service guide delivery channel 630 may be a broadcast channel or an interactive channel.

Each service guide delivery unit includes one or more service guide fragments 650. The terminal configures a service guide in the terminal by using the service guide fragment 650 existing in the service guide delivery unit 640.

Figure 11:
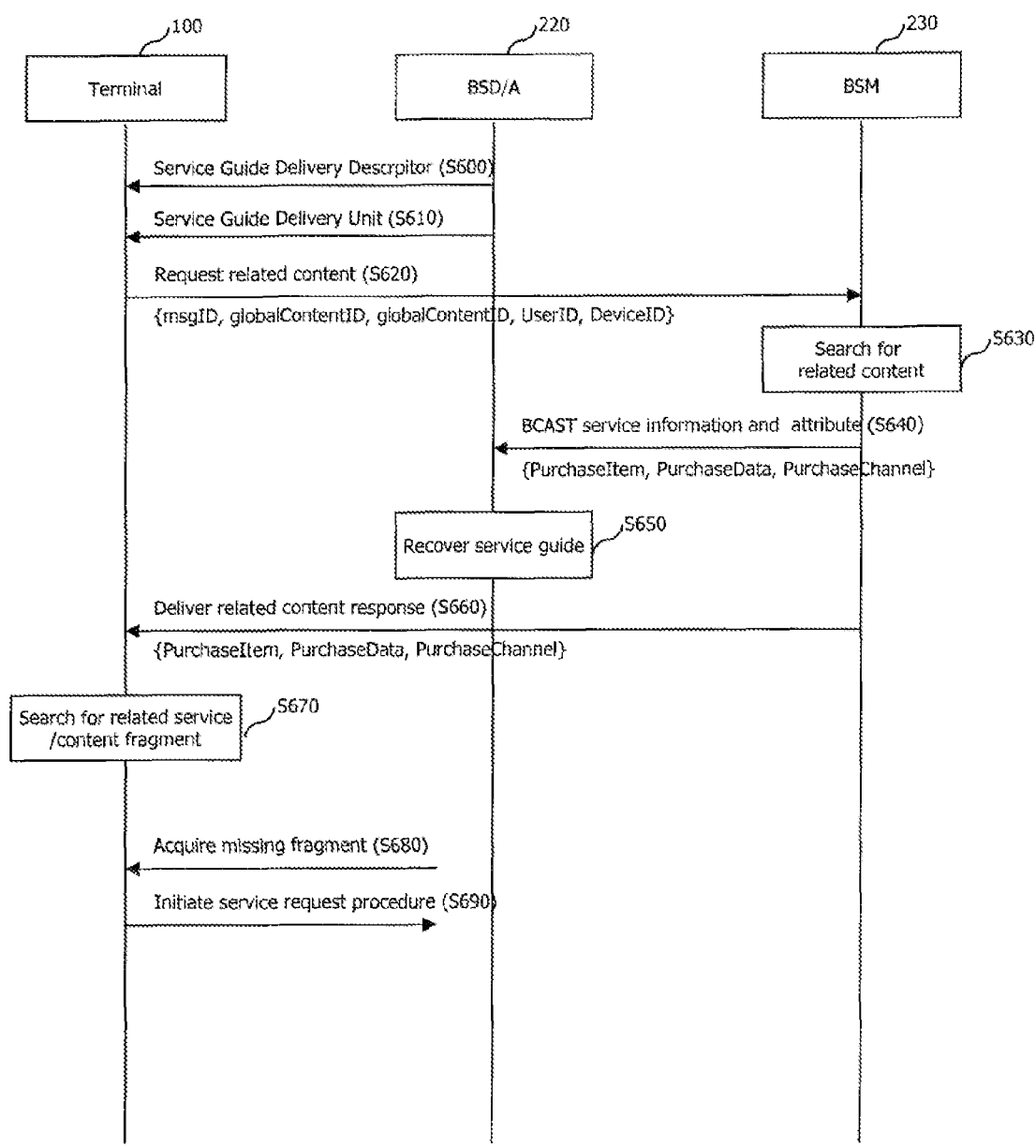
FIG. 11 is a signal flow chart illustrating in detail a procedure of receiving a service guide in the system according to an exemplary embodiment of the present invention.

FIG. 11 is a signal flow chart illustrating in detail a procedure of receiving a service guide in the system according to an exemplary embodiment of the present invention. Compared with the exemplary embodiment illustrated in FIG. 6, the exemplary embodiment with reference to FIG. 11 illustrates in detail the process of receiving the service guide before performing the step of requesting by the terminal 100 related contents from the BSM 230. Also, the present exemplary embodiment proposes a method of acquiring a missing fragment by the terminal 100 when the terminal 100 does not have a complete set of the service guide fragments indicated in the related contents response message for some reasons such as a network failure, a missing SG reception, or a memory shortage.

Hereinafter, a processing procedure of the system according to the exemplary embodiment illustrated in FIG. 11 will now be described.

First, the terminal 100 receives the service guide delivery descriptor 610 via the service guide announcement channel 600 from the BSD/A 200. The service guide delivery descriptor 610 includes the descriptor entry 620 that refers to the service guide delivery unit 640 to be transmitted to the terminal 100. After the reception, the terminal 100 tunes with the SG notification channel to receive the service guide delivery descriptor 610 corresponding to the terminal 100. The terminal 100 determines the service guide delivery units 640 to be received by the terminal 100 through BSM selector information included in the service guide delivery descriptor 610 (S600).

The step of receiving the service guide delivery unit 640 will now be described (S610). The method of step S610 varies depending on whether or not the service guide delivery channel 643 for delivery the service guide delivery unit 640 is a broadcast channel or an interactive channel.

First, the service guide delivery unit 640 delivered via the service guide delivery channel 630, a broadcast channel, is processed as follows.

The BSD/A 200 transmits the service guide delivery unit 640 to the terminal via the broadcast channel stated by the service guide delivery descriptor 610. The service guide delivery unit 640 includes one or more service guide fragments. The service guide delivery descriptor 610 received by the terminal 100 in the step S600 includes the descriptor entry 620, and the descriptor entry 620 includes information regarding a broadcast channel via which the service guide delivery unit 640 is being transmitted. According to the information regarding the broadcast channel, the terminal turns with the broadcast channel to receive the service guide delivery unit 640 (S610).

Meanwhile, the service guide delivery unit 640 delivered via the service guide delivery channel 630, an interactive channel, is processed as follows.

The terminal 100 requests the service guide delivery unit 640 from the BSD/A 200 through SG entry point information included in the received service guide delivery descriptor 610. The BSD/A 200 transmits a response to the request and the service guide delivery unit 640 to the terminal 100 (S610).

The following several steps S620, S630, and S640 correspond to the steps S100, S110, and S130 described above with reference to FIG. 4, respectively. Thus, a repeated description of the steps will be omitted.

Next, when the BCAST service information and attributes are transmitted to the BSD/A 200, the BSD/A 200 stores service/content fragments referred to by the purchase item fragment and every fragment having a connection with the service/content fragments in the BSD/A 200 by using idRef that refers to the service/content fragment existing in the purchase item fragment received from the BSM 300 (S650). The storing is to make preparations in the occurrence of a request of the fragments.

The following step S660 corresponds to the step S220 described above with reference to FIG. 6. Thus, a repeated description of the step will be omitted.

Here, in FIG. 11, the step of delivering the BCAST service information and attribute and the step of recovering the service guide (S640 and S650) are performed before the step (S660) of transmitting the related contents response. However, unlike the illustration, the step of delivering the BCAST service information and attribute and the step of recovering the service guide (S640 and S650) may be performed later than the step (S660) of transmitting the related contents response, or the both may be performed simultaneously or in an overlapping manner.

The terminal 100 may not have a complete set of the service guide fragments indicated in the related contents response message for some reasons such as a network failure, a missing SG reception, or a memory shortage. Thus, the terminal 100 searches a service matched within the stored service guide acquired through such a particular procedure as in the different exemplary embodiments of the present invention described above for the identifier reference (idRef) of the service reference and content reference in the purchase item fragment.

Namely, when the terminal receives the related contents response, the terminal obtains the idRef by parsing the purchase item fragments existing in the related contents response. The idRef is information that refers to the service/content fragments existing in the purchase item fragments. The terminal 100 checks whether or not the service and content fragments referred to by the purchase item fragments are all stored in the terminal 100 by using the idRef (S670).

Upon checking, when there is a missing service and content fragments not stored in the terminal 100, namely, when the terminal 100 fails to search for any service or content fragment referred by the purchase item fragment, the terminal 100 acquires the missing fragments through the particular fragment as in the different exemplary embodiment of the present invention described above (S680). For example, the steps S250, S252, S254, and S256 described above with reference to FIG. 6 may be an example of the particular procedure for obtaining the missing fragments.

Next, after acquiring the requested service fragments, the terminal 100 initiates the service request procedure by using the information existing in the received purchase fragment (S690). For example, the steps S260, S270, S275 S280, S290, and S295 described above with reference to FIG. 6 may be an example of the service request procedure.

The above-described process may be performed in the terminal 100 that includes a transceiver communicating with the server such as the BSM 230 or the like and a controller for controlling the transceiver. The transceiver may transmit a content request message including an identifier of particular content to the server, receive a content response message including information regarding content related to the particular content from the server, and receive an operation of receiving reception guide information of the related contents based on the information.

The method according to the exemplary embodiments of the present invention described so far may be implemented by software, hardware or their combination. For example, the method according to the present invention may be stored in a storage medium (e.g., an internal memory, a flash memory of a mobile terminal, a hard disk, or the like), and may be implemented by codes or command languages in a software program that can be executed by a processor (e.g., an internal microprocessor of a mobile terminal).

As the present invention may be embodied in several forms without departing from the characteristics thereof it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method for receiving a service guide, the method comprising:
storing, upon reception by a terminal capable of playing a content, at least a content fragment of the service guide;
transmitting, by the terminal to a server, a request message in which a global content identifier of an interested content acquired from the content fragment of the service guide is added;
receiving, by the terminal, a response message including a purchase related fragment of a service guide for at least one content related to the global content identifier of the interested content; and
if the terminal does not have remaining fragments of the service guide for the at least one content, trying to receive the remaining fragments of the service guide,
wherein the response message further includes:
an expiration time field indicating an expiration time informing the terminal that a purchase item fragment is scheduled to be up-to-date until the expiration time, and
a valid to field indicating a last time when price information is to be valid,
wherein the global content identifier is added to the request message so that the global content identifier will be processed with priority in a same manner as when only a global content identifier is added, and
wherein the response message is received when the at least one content related to the global content identifier of the interested content exists and is provided as an on-demand service.

2. The method of claim 1, wherein the request message is a related contents request message.

3. The method of claim 1, wherein the response message is a related contents response message.

4. The method of claim 1, wherein the response message further includes a global state code.

5. The method of claim 4, wherein the global state code has a value indicating success, if the at least one or more related contents are capable of being provided as an on-demand service.

6. The method of claim 1, wherein the purchase related fragment of the service guide is to provide an on-demand service of each of the at least one or more related contents and an on-demand service of a bundle of the at least one or more related contents.

7. The method of claim 1, wherein the purchase related fragment comprises one or more of a purchase item fragment, a purchase channel fragment, and a purchase data fragment.

8. The method of claim 7, wherein an identified fragment includes at least one or more of a service fragment and a content fragment referred to by the purchase item fragment.

9. The method of claim 8, wherein the service fragment or the content fragment referred to by the purchase item fragment is a service or content fragment matched to each of a service reference, a content reference, and an identifier reference in the purchase item fragment.

10. A terminal for receiving and playing content related to particular content, the terminal comprising:
a storage unit;
a transceiver configured to communicate with a server; and
a controller configured to control the storage unit and the transceiver to:
store at least a content fragment of a service guide,
transmit to a server a request message in which a global content identifier of an interested content acquired from the content fragment of the service guide is added,
receive a response message including a purchase related fragment of a service guide for at least one content related to the global content identifier of the interested content, and
if the terminal does not have remaining fragments of the service guide for the at least one content, try to receive the remaining fragments of the service guide,
wherein the response message further includes:
an expiration time field indicating an expiration time informing the terminal that a purchase item fragment is scheduled to be up-to-date until the expiration time, and
a valid to field indicating a last time when price information is to be valid,
wherein the global content identifier is added to the request message so that the global content identifier will be processed with priority in a same manner as when only a global content identifier is added, and
wherein the response message is received when the at least one content related to the global content identifier of the interested content exist and are provided as an on-demand service.

11. The terminal of claim 10, wherein the response message further includes a global state code.

12. The terminal of claim 11, wherein the global state code has a value indicating success, if the at least one related content is capable of being provided as an on-demand service.

13. The terminal of claim 10, wherein the purchase related fragment of the service guide is to provide an on-demand service of each of the at least one er related content and an on-demand service of a bundle of the at least one er related content.

14. The terminal of claim 10, wherein the purchase related fragment comprises one or more of a purchase item fragment, a purchase channel fragment, and a purchase data fragment.

15. The terminal of claim 14, wherein an identified fragment includes at least one or more of a service fragment and a content fragment referred to by the purchase item fragment.

16. The terminal of claim 15, wherein the service fragment or the content fragment referred to by the purchase item fragment is a service or content fragment matched to each of a service reference, a content reference and an identifier reference in the purchase item fragment.

\* \* \* \* \*